(12) United States Patent
Sada et al.

(10) Patent No.: US 7,839,946 B2
(45) Date of Patent: Nov. 23, 2010

(54) DATA COMMUNICATION APPARATUS AND DATA COMMUNICATION METHOD

(75) Inventors: Tomokazu Sada, Osaka (JP); Masaru Fuse, Osaka (JP); Satoshi Furusawa, Osaka (JP); Tsuyoshi Ikushima, Nara (JP); Tomoaki Ohira, Osaka (JP)

(73) Assignee: Panasonic Corporation, Osaka (JP)

( * ) Notice: Subject to any disclaimer, the term of this patent is extended or adjusted under 35 U.S.C. 154(b) by 722 days.

(21) Appl. No.: 11/889,708

(22) Filed: Aug. 15, 2007

(65) Prior Publication Data

US 2008/0056405 A1   Mar. 6, 2008

(30) Foreign Application Priority Data

Aug. 30, 2006 (JP) .............................. 2006-233504
Jan. 24, 2007 (JP) .............................. 2007-014279

(51) Int. Cl.
    H04L 25/34 (2006.01)
(52) U.S. Cl. ..................................................... 375/286
(58) Field of Classification Search ................. 375/286, 375/295, 316; 380/255–276, 41
    See application file for complete search history.

(56) References Cited

U.S. PATENT DOCUMENTS 3,716,852 A * 2/1973 Sawai ........................... 341/56
4,464,765 A * 8/1984 Shimizu ....................... 375/292
6,577,684 B1 * 6/2003 Hirano et al. ................ 375/286

FOREIGN PATENT DOCUMENTS

JP   09-205420    8/1997
JP   2005-057313  3/2005

OTHER PUBLICATIONS

Neri et al. Unequal Error Protection: a Turbo Multi Level Coding Approach, 2003, IEEE, p. 102-106.*
"Cryptography and Network Security: Principles and Practice" Second Edition, William Stallings, Prentice-Hall, Inc., New Jersey, 1999, pp. 131-159 w/translation.
"Applied Cryptography" Second Edition, Bruce Schneier, John Wiley & Sons, Inc., 1996, pp. 369-395 w/translation.

* cited by examiner

Primary Examiner—Sam K Ahn
(74) Attorney, Agent, or Firm—Wenderoth, Lind & Ponack, LLP.

(57) ABSTRACT

A data communication apparatus improves security against eavesdropping for secret communication by using Y-00 protocol. A multi-level code generation section generates, based on key information, a multi-level code sequence in which a signal level changes so as to be approximately random numbers. A level conversion section irreversibly converts the multi-level code sequence such that a converted multi-level code sequence does not constitute a mapping of the multi-level code sequence. A multi-level processing section generates a multi-level signal having a plurality of levels each corresponding to a combination between the information data and the multi-level code sequence. A modulator section modulates a multi-level signal in a predetermined modulation method and outputs a modulated signal.

11 Claims, 19 Drawing Sheets

FIG. 2A

| MULTI-LEVEL CODE SEQUENCE 12 | 0 | 1 | 2 | 3 | 4 | 5 | 6 |
|---|---|---|---|---|---|---|---|
| MULTI-LEVEL CODE SEQUENCE 12 AFTER SUBTRACTING 3 THEREFROM | −3 | −2 | −1 | 0 | 1 | 2 | 3 |
| CONVERTED MULTI-LEVEL CODE SEQUENCE 13 | 3 | 2 | 1 | 0 | 1 | 2 | 3 |

CONVERSION

FIG. 2B

| CONVERTED MULTI-LEVEL CODE SEQUENCE 13 | 3 | 2 | 1 | 0 | 1 | 2 | 3 |
|---|---|---|---|---|---|---|---|
| CANDIDATES FOR MULTI-LEVEL CODE SEQUENCE 12 ASSUMED BY EAVESDROPPER | 0 or 6 | 1 or 5 | 2 or 4 | 3 | 2 or 4 | 1 or 5 | 0 or 6 |
| NUMBER OF COMBINATIONS TO WHICH MATHEMATICAL ALGORITHM APPLIED | 2 × 2 × 2 × 1 × 2 × 2 × 2 = 64 PATTERNS | | | | | | |

INVERSE OPERATION

FIG. 3A

| MULTI-LEVEL CODE SEQUENCE 12 | 6 | 3 | 7 | 2 | 5 | 1 |
|---|---|---|---|---|---|---|
| CONVERTED MULTI-LEVEL CODE SEQUENCE 13 | 9 | | 9 | | 6 | |

CONVERSION (ADDITION)

FIG. 3B

| CONVERTED MULTI-LEVEL CODE SEQUENCE 13 | 9 | 9 | 6 |
|---|---|---|---|
| CANDIDATES FOR MULTI-LEVEL CODE SEQUENCE 12 ASSUMED BY EAVESDROPPER | (2, 7) (3, 6) (4, 5) (5, 4) (6, 3) (7, 2) | (2, 7) (3, 6) (4, 5) (5, 4) (6, 3) (7, 2) | (0, 6) (1, 5) (2, 4) (3, 3) (4, 2) (5, 1) (6, 0) |
| NUMBER OF COMBINATIONS TO WHICH MATHEMATICAL ALGORITHM APPLIED | 6 × 6 × 7 =252 PATTERNS | | |

INVERSE OPERATION

F I G. 6
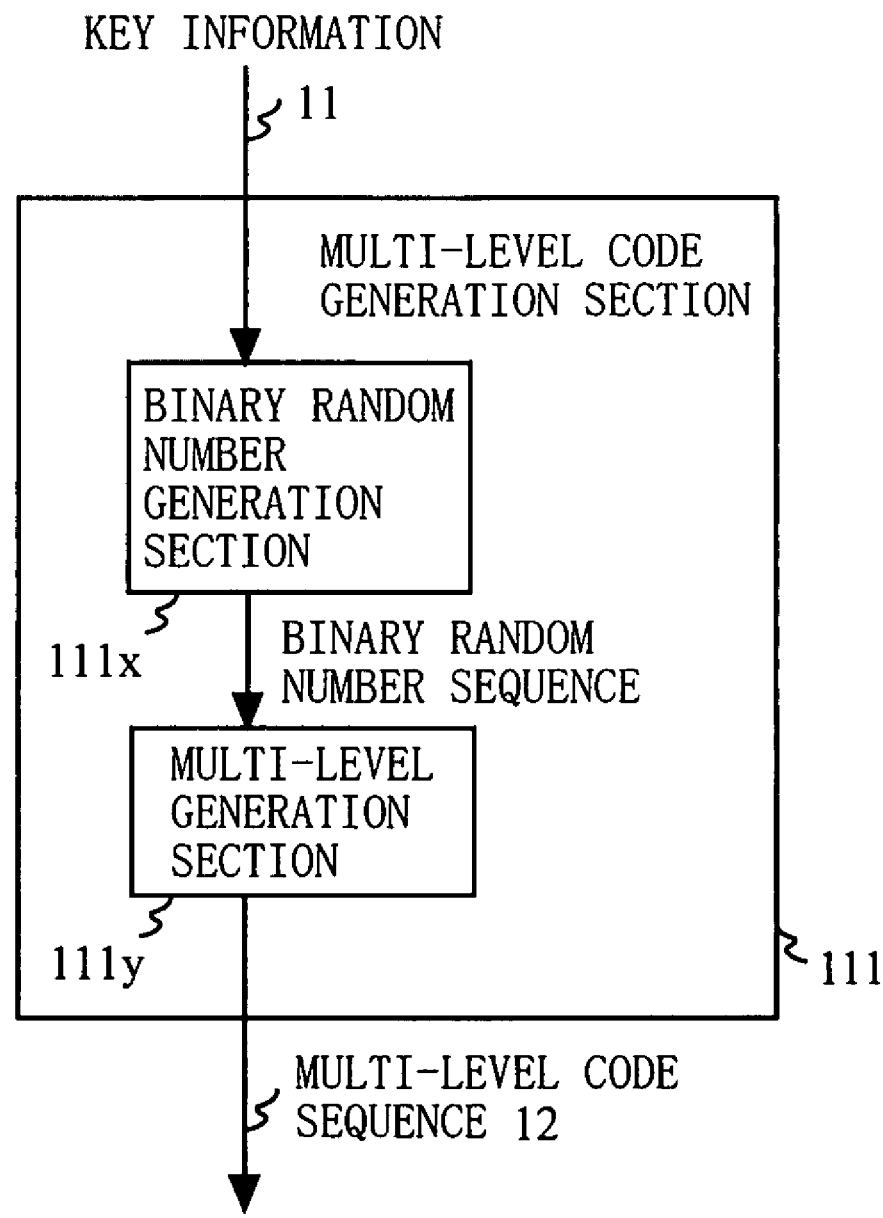

US 7,839,946 B2

DATA COMMUNICATION APPARATUS AND DATA COMMUNICATION METHOD

BACKGROUND OF THE INVENTION

1. Field of the Invention

The present invention relates to an apparatus and a method for performing cipher communication in order to avoid interception (such as eavesdropping) by a third party. More specifically, the present invention relates to a data communication apparatus and a data communication method for performing data communication through setting a specific encoding/decoding (modulation/demodulation) method between a legitimate transmitter and a legitimate receiver.

2. Description of the Background Art

Conventionally, in order to perform communication between specific parties, there has been generally adopted a structure for realizing cipher communication by sharing original information (hereinafter referred to as key information) between transmitting and receiving ends so as to mathematically perform an operation (encoding) and inverse operation (decoding) of plain text which is information data to be transmitted between the transmitting and receiving ends.

On the other hand, there have been suggested, in recent years, several encryption methods, which positively utilize physical phenomenon occurring on a transmission line. As one of the encryption method, there is a method called Y-00 protocol for performing the cipher communication by utilizing a quantum noise generated in the transmission line.

FIG. 15 is a block diagram showing an exemplary configuration of a conventional data communication apparatus 9 using the Y-00 protocol disclosed in Japanese Laid-Open Patent Publication No. 2005-57313 (hereinafter referred to as Patent Document 1). Hereinafter, the configuration and an operation of the conventional data communication apparatus 9 disclosed in Patent Document 1 will be described. As shown in FIG. 15, the conventional data communication apparatus 9 includes a transmitting section 901, a receiving section 902, and a transmission line 910. The transmitting section 901 includes a multi-level code generation section 911, a multi-level processing section 912, and a modulator section 913. The receiving section 902 includes a multi-level code generation section 914, a demodulator section 915, and a decision section 916. Note that an eavesdropping receiving section 903 is an apparatus used by an intercepting party, and is not included in the conventional data communication apparatus 9.

First, the transmitting section 901 and the receiving section 902 previously retain key information 91 and key information 96, respectively, which are identical in content to each other. Hereinafter, an operation of the transmitting section 901 will be described first. The multi-level code generation section 911 generates, based on the key information 91, a multi-level code sequence 92, which is a multi-level pseudo random number series having M values from "0" to "M−1" (M is an integer of 2 or more), by using a pseudo random number generator. The multi-level processing section 912 generates, based on the information data 90 to be transmitted to the receiving section and the multi-level code sequence 92, a multi-level signal 93, which is an intensity modified signal, by using a signal format described hereinbelow.

FIG. 16 is a diagram showing a signal format of a multi-level signal used by the multi-level processing section 912. As shown in FIG. 16, in the case where the number of values included in the multi-level code sequences 92 is M, signal intensity thereof is divided into 2M signal intensity levels (hereinafter simply referred to as a level). These 2M levels are made into M pairs (hereinafter referred to as a modulation pair), and to one level of each of the M modulation pairs, a value "0" of the information data 90 is allocated, and to the other level, a value "1" of the information data 90 is allocated. Generally, the allocation is made such that levels corresponding to the value "0" of the information data 90 and levels corresponding to the value "1" of the information data 90 are evenly distributed over the whole of the 2M levels. In FIG. 16, "0" is allocated to a lower level of an even-numbered modulation pair, and "1" is allocated to a higher level of the same. On the other hand, with respect to an odd-numbered modulation pair, "1" is allocated to a lower level thereof, and "0" is allocated to a higher level thereof. Accordingly, the values "0" and "1" are alternately allocated to each of the 2M levels.

The multi-level processing section 912 selects a modulation pair corresponding to each of the values of the multi-level code sequence 92 having been inputted, then selects one level of the modulation pair corresponding to the values of the information data 90, and outputs a multi-level signal 93 having the selected level. The modulator section 913 modulates the multi-level signal 93 outputted by the multi-level processing section 912 into a modulated signal 94 which is an intensity modulated signal, and transmits the modulated signal 94 to the receiving section 902 via the transmission line 910. (Note that, in Patent Document 1, the first multi-level code generation section 911 is described as a "transmitting pseudo random number generation section", the multi-level processing section 912 as a "modulation method specification section" and a "laser modulation driving section", the modulator section 913 as a "laser diode", the demodulator section 915 as a "photo-detector", the second multi-level code generation section 914 as a "receiving pseudo random number generation section", and the decision section 916 as a "determination circuit".)

Next, an operation of the receiving section 902 will be described. The demodulator section 915 demodulates the modulated signal 94 transmitted via the transmission line 910, and outputs a multi-level signal 95. The multi-level code generation section 914 generates, based on the key information 96, a multi-level code sequence 97, which is a multi-level pseudo random number series equal to the multi-level code sequence 92. The decision section 916 decides each of the modulation pair used for the multi-level signal 95 in accordance with respective values of the multi-level code sequence 97 inputted by the multi-level code generation section 914. The decision section 916 performs binary decision, using the decided modulation pair and the multi-level signal 95 which is inputted by the demodulator section 915, so as to obtain information data 98 which is equal to the information data 90.

FIG. 17 is a diagram specifically illustrating the operation of the conventional data communication apparatus 9. Hereinafter, with reference to FIG. 17, the operation of the conventional data communication apparatus 9 in the case where the number of the values included in the multi-level code sequences 92 is 4 (M=4) will be specifically described. As shown in (a) and (b) of FIG. 17, an exemplary case will be described where the value of the information data 90 changes {0, 1, 1, 1}, and a value of the multi-level code sequence 92 changes {0, 3, 2, 1}. In this case, a level of the multi-level signal 93 of the transmitting section 901 changes {0, 3, 6, 1}, as shown in FIG. 17(c).

Specifically, at a time period t1 shown in FIG. 17(c), a 0th modulation pair (a pair of level 0 and level 4) corresponding to a value "0" of the multi-level code sequence 92 is selected. Next, level 0 of the 0th modulation pair which corresponds to the value "0" of information data 90 is selected, and the selected level 0 comes to a level of the multi-level signal 93 at the time period t1. In a similar manner, at a time period t2, a third modulation pair (a pair of level 3 and level 7) corresponding to a value "3" of the multi-level code sequence 92 is selected. Next, level 3 of the third modulation pair which corresponds to the value "1" of the information data 90 is selected, and the selected level 3 comes to a level of the multi-level signal 93 at t2. For a time period t3 and a time period t4 as well, a level of the multi-level signal 93 is selected in a similar manner. In this manner, at each of the time periods t1 and t3, in which the value of the multi-level code sequence 92 is even-numbered, the lower level of the modulation pair corresponds to the value "0" of the information data, and the higher level thereof corresponds to the value "1" of the information data. On the other hand, at each of the time periods t2 and t4, in which the value of the multi-level code sequence 92 is odd-numbered, the lower level of the modulation pair corresponds to the value "1" of the information data, and the higher level thereof corresponds to the value "0" of the information data.

Next, the multi-level signal 95 inputted to the decision section 916 of the receiving section 902 is a signal which changes as shown in FIG. 17(*e*), and which includes a noise (a disturbing element) such as a shot noise generated when the modulated signal 94 is demodulated by the demodulator section 915. The decision section 916 selects the respective modulation pairs corresponding to the respective values of the multi-level code sequence 97 (see FIG. 17(*d*)) which is equal to the multi-level code sequence 92. As shown in FIG. 17(*e*), an intermediate level of each of the modulation pairs is set as a decision level thereof. The decision section 916 decides whether the multi-level signal 95 is higher or lower than the decision level.

Specifically, at a time period t1 shown in FIG. 17(*e*), the decision section 916 selects a 0th modulation pair (a pair of level 0 and level 4) corresponding to a value "0" of the multi-level code sequence 97, and sets level 2, which is an intermediate level of the 0th modulation pair, as a decision level. Since the multi-level signal 95 is generally distributed in lower levels than the decision level at t1, the decision section 916 then decides that the multi-level signal 95 is lower than the decision level at t1. In a similar manner, at a time period t2, the decision section 916 selects a third modulation pair (a pair of level 3 and level 7) corresponding to a value "3" of the multi-level code sequence 97, and sets level 5, which is an intermediated level of the third modulation pair, as a decision level. Since the multi-level signal 95 is generally distributed in lower levels than the decision level at t2, the decision section 916 decides that the multi-level signal 95 is lower than the decision level at t2. At time periods t3 and t4 as well, decision is made in a similar manner. Accordingly, a result of the binary decision performed by the decision section 916 comes to "lower, lower, higher, lower".

Next, in the case where the value of the multi-level code sequence 97 is an even-number (in the case of the time periods t1 and t3), the decision section 916 decides that a lower level of the selected pair is "0" and that an upper level thereof is "1", and then outputs the decided values as the information data 98. On the other hand, in the case where the value of the multi-level code sequence 97 is an odd-number (in the case of the time periods t2 and t4), the decision section 916 decides a lower level of the selected modulation pair is "1" and that an upper level thereof is "0", and then outputs the decided values as the information data 98. The values of the multi-level code sequence 97 are {0, 3, 2, 1}, that is, "even, odd, even, odd" (even represents an even number, and odd represents an odd number). Accordingly, the decision section 916 outputs {0, 1, 1, 1} as the information data 98 which is equal to the information data 90 (see FIG. 17(*f*)). In this manner, the decision section 916 can obtain the information data 98 from the multi-level signal 95 depending on whether the value of the multi-level code sequence 97 is even-numbered or odd-numbered.

The above described specifically is a case using a signal format (see FIG. 16) in which the values of the information data to be allocated to the lower level and the upper level of the modulation pair vary depending on whether the value of the multi-level code sequence 97 is even-numbered or odd-numbered. However, the signal format is not limited to this. For example, it may be possible to use a signal format in which the information data "1" is consistently allocated to a higher level of the modulation pair, and the information data "0" is consistently allocated to a lower level thereof.

Further, as above described, the multi-level signal 95 includes the noise such as the shot noise which is generated when the modulated signal 94 is demodulated by the demodulator section 915. However, an interval between the levels (hereinafter referred to as a step width) is set appropriately, whereby occurrence of erroneous binary decision may be suppressed to a negligible level.

Next, possible eavesdropping (including interception) will be described. As shown in FIG. 15, an eavesdropper attempts decryption of the information data 90 or the key information 91 from the modulated signal 94 by using an eavesdropper receiving section 903, without having key information shared between a transmitting party and a receiving party. The eavesdropper receiving section 903 includes a demodulator section 921, a multi-level decision section 922, and a decryption processing section 923, and is connected to the transmission line 910.

In the case where the eavesdropper performs the same binary decision as a legitimate receiving party (the receiving section 902), the eavesdropper needs to attempt decision with respect to all possible values the key information may take since the eavesdropper does not have the key information. However, when this method is used, the number of attempts of the decision increases exponentially with respect to a length of the key information. Accordingly, if the length of the key information is significantly long, the method is not practical.

As a further effective method, it is assumed that the eavesdropper performs multi-level decision of the multi-level signal 81 using the multi-level decision section 922, the multi-level signal 81 having been obtained by demodulating the modulated signal 94 using the demodulator section 921, and decrypts a resultant received sequence 82 using the decryption processing section 923, thereby attempting decryption of the information data 90 or the key information 91. In the case of using such a decryption method, if the eavesdropper receiving section 902 can receive (decide) the multi-level signal 93 as the received sequence 82 without mistake, it is possible to decrypt the key information 91 using the received sequence 82 at a first attempt.

Since the shot noise (the disturbing element), which is generated when the modulated signal 94 is demodulated by the demodulator section 921, is overlapped on the modulated signal 94, the shot noise is included in the multi-level signal 81. It is known that the shot noise is inevitably generated in accordance with the principle of quantum mechanics. If the step width of the multi-level signal 93 is set significantly smaller than a distribution width of the shot noise, the multi-level signal 81 including the noise may be distributed over other various levels than a correct level (the level of the multi-level signal 93). For example, as shown in FIG. 17(*g*), at t2, the multi-level signal 81 is distributed over levels 2 to 4.

Accordingly, the eavesdropper needs to perform decryption in consideration of a possibility (a possibility of erroneous decision) that the level of the received sequence 82 obtained through the decision is different from the correct level. Therefore, compared to a case without the erroneous decision, the number of the attempts (hereinafter referred to as the number of possible receiving patterns), that is, computational complexity required for the decryption is increased. As a result, security against the eavesdropping improves.

However, the above-described conventional data communication apparatus 9 has a problem described below. Since the distribution width of the shot noise (the disturbing element), which is generated when the modulated signal 94 is demodulated by the demodulator section 921, is small, levels of erroneous multi-level decision, which is decided by the eavesdropper, appear only in a range close to the level of the multi-level signal 93 (a legitimate signal). For example, at a time period t2 shown in FIG. 17(g), a level of the multi-level signal 93 is 3, whereas a level which the eavesdropper may erroneously take is limited to 2 or 4. Accordingly, the eavesdropper can perform decryption based on the assumption that a level of the legitimate signal exists in the vicinity of the level which is received by the eavesdropper. As a result, in the conventional data communication apparatus 9, the number of possible receiving patterns required for the decryption by the eavesdropper decreases. Accordingly, sufficient security of the cipher communication cannot be ensured.

FIG. 18 is a diagram illustrating the number of the possible receiving patterns of the conventional data communication apparatus 9 shown in FIG. 15. FIG. 19 is a diagram illustrating the multi-level signal 93 shown in FIG. 18(c). Hereinafter, with reference to FIGS. 18 and 19, the number of possible receiving patterns of the conventional data communication apparatus 9 will be described. As shown in (a) and (b) of FIG. 18, an exemplary case will be described where the information data 90 to be inputted to the multi-level processing section 912 of the transmitting section 901 is {1, 0, 1, 1}, and the multi-level code sequence 92, whose multi-level number M is 8, is {4, 1, 4, 2}. In this case, the multi-level processing section 912 shown in FIG. 15 generates {12, 9, 12, 10} as the multi-level signal 93 in accordance with the signal format shown in FIG. 16 (see FIG. 18(c) and FIG. 19). The multi-level signal 93 {12, 9, 12, 10} is modulated by the modulator section 913, and transmitted as the modulated signal 94 via the transmission line 910.

The eavesdropper demodulates, by using the demodulator section 921 (see the eavesdropper receiving section 903 shown in FIG. 15), the modulated signal 94 on the transmission line 910, and then obtains the multi-level signal 81. As already described, the multi-level signal 81 includes the shot noise, which is the disturbing element, and thus an erroneous multi-level decision may occur in the multi-level decision section 922. Hereinafter, the number of possible levels which the multi-level decision section 922 may decide as a result of the erroneous multi-level decision is referred to as a "possible decision number J". As an example, a case will be described where there is a possibility, as a result of the multi-level decision, that the multi-level decision section 922 decides a total of three different levels of a legitimate level (the level of the multi-level signal 93), a level upwardly adjoining to the legitimate level, and a level downwardly adjoining to the legitimate level. That is, a case of the possible decision number J=3 will be described. In this case, the received sequence 82 which is obtained as a result of the multi-level decision by the eavesdropper is, for example, {11, 10, 13, 10} (see FIG. 18(d)). In the case where the eavesdropper attempts the decryption of the legitimate signal (multi-level signal 93), it is assumed that the eavesdropper estimates the legitimate signal in accordance with the possible decision number J, derives the multi-level code sequence 92 using the signal format shown in FIG. 16, and then attempts identification of the key information 91 using the derived multi-level code sequence 92.

Specifically, the eavesdropper can estimate, in consideration of the possible decision number J=3, that the values of the multi-level signal 93, which is a legitimate signal having been transmitted, are any values within respective ranges of {10 to 12, 9 to 11, 12 to 14, 9 to 11}. The eavesdropper can also estimate, by using the signal format shown in FIG. 16, that the values of the multi-level code sequence 92 used by the transmitting section 901 are any values within respective ranges of {2 to 4, 1 to 3, 4 to 6, 1 to 3}. The eavesdropper can narrow possible values taken by the multi-level code sequence 92 down to "3 patterns×3 patterns×3 patterns×3 patterns=81 patterns". Accordingly, the number of the attempts for decryption of the multi-level code sequence 92 performed by the eavesdropper is a total of 3×3×3×3=81 patterns. That is, the number of possible receiving patterns in the conventional data communication apparatus 9 is 81.

As above described, in the eavesdropper receiving section 903, since the distribution width of the shot noise generated in the demodulator section 921 is small, a range of levels in which the multi-level decision section 922 may cause the erroneous multi-level decision is limited at some level. Accordingly, in the conventional data communication apparatus 9, the number of possible receiving patterns for the eavesdropper to decrypt the multi-level code sequence 92 is small, and thus it is impossible to ensure sufficient security in the cipher communication.

SUMMARY OF THE INVENTION

Therefore, an object of the present invention is to provide a data communication apparatus and a data communication method which are capable of ensuring high security in cipher communication by increasing the number of possible receiving patterns.

The present invention is directed to a data transmitting apparatus for encrypting information data by using predetermined key information and performing secret communication with a receiving apparatus. To attain the above described object, the data transmitting apparatus of the present invention includes: a multi-level code generation section for generating, based on the predetermined key information, a multi-level code sequence in which a signal level changes so as to be approximately random numbers; a multi-level code conversion section for converting the multi-level code sequence into a converted multi-level code sequence; a multi-level processing section for combining the information data and the converted multi-level code sequence and generating a multi-level signal having a plurality of levels each corresponding to a combination of the information data and the converted multi-level code sequence; and a modulator section for modulating the multi-level signal in a predetermined modulation method, and outputting a modulated signal. The multi-level code conversion section irreversibly converts the multi-level code sequence such that the converted multi-level code sequence does not become a mapping of the multi-level code sequence.

Accordingly, even if an eavesdropper incidentally obtains a correct converted multi-level code sequence in accordance with the modulated multi-level signal, it is possible to complicate processes for performing an inverse operation of the multi-level code sequence in accordance with the converted multi-level code sequence and for identifying the key information.

Further, the predetermined key information may include a plurality of pieces of key information. In this case, the multi-level code generation section generates, based on the plurality of pieces of the key information, a plurality of the multi-level code sequences each in which the signal level changes so as to be approximately random numbers, and the multi-level code conversion section converts the plurality of the multi-level code sequences into the converted multi-level code sequence.

Preferably, the multi-level code conversion section is constituted of an accumulation section which generates, as the converted multi-level code sequence, an accumulated multi-level code sequence which is obtained by accumulating values included in the multi-level code sequence. The accumulation section adds a value obtained by multiplying a (k−1)th value of the accumulated multi-level code sequence by a predetermined number and a kth value of the multi-level code sequence, and sets a resultant added value as a kth value of the accumulated multi-level code sequence.

Further, the accumulation section may add a value obtained by multiplying a (k−1)th value of the accumulated multi-level code sequence by a predetermined number and a kth value of the multi-level code sequence, divide a resultant added value by a predetermined value, and set a resultant remainder as a kth value of the accumulated multi-level code sequence. Alternatively, the accumulation section may output a (k+1)th value of the accumulated multi-level code sequence as a kth value of the accumulated multi-level code sequence.

Preferably, a multi-level number of the multi-level code sequence is equal to or less than a square of a number of multi levels which appear within a distribution width of a disturbing element which is overlapped on the modulated signal upon reception of the modulated signal.

Further, the present invention is directed to a data receiving apparatus for receiving information data which is encrypted by using predetermined key information, and performing secret communication with a transmitting apparatus. To attain the above-described object, the data receiving apparatus of the present invention includes: a multi-level code generation section for generating, based on the predetermined key information, a multi-level code sequence in which a signal level changes so as to be approximately random numbers; a multi-level code conversion section for converting the multi-level code sequence into a converted multi-level code sequence; a demodulator section for demodulating, in a predetermined demodulation method, a modulated signal received from the transmitting apparatus, and outputting a multi-level signal having a plurality of levels each corresponding to a combination of the information data and the converted multi-level code sequence; and a decision section for deciding which is the information data from the multi-level signal in accordance with the converted multi-level code sequence. The multi-level code conversion section irreversibly converts the multi-level code sequence such that the converted multi-level code sequence does not become a mapping of the multi-level code sequence.

The predetermined key information may include a plurality of pieces of key information. In this case, the multi-level code generation section generates, based on the plurality of pieces of key information, a plurality of the multi-level code sequences each in which a signal level changes so as to be approximately random numbers, and the multi-level code conversion section converts the plurality of the multi-level code sequences into the converted multi-level code sequence.

Preferably, the multi-level code conversion section is constituted of an accumulation section which generates, as the converted multi-level code sequence, an accumulated multi-level code sequence which is obtained by accumulating values included in the multi-level code sequence. The accumulation section adds a value obtained by multiplying a (k−1)th value of the accumulated multi-level code sequence by a predetermined number and a kth value of the multi-level code sequence, and sets a resultant added value as a kth value of the accumulated multi-level code sequence.

Further, respective component parts included in the above-described data transmitting apparatus may be regarded as a data transmitting method for encrypting information data by using predetermined key information, and performing secret communication with a receiving apparatus. That is, the data transmitting method includes: a multi-level code generation step of generating, based on the predetermined key information, a multi-level code sequence in which a signal level changes so as to be approximately random numbers; a multi-level code conversion step of converting the multi-level code sequence into a converted multi-level code sequence; a multi-level processing step of combining the information data and the converted multi-level code sequence, and generating a multi-level signal having a plurality of levels each corresponding to a combination of the information data and the converted multi-level code sequence; and a modulation step of modulating the multi-level signal in a predetermined modulation method, and outputting a modulated signal. The multi-level conversion step irreversibly converts the multi-level code sequence such that the converted multi-level code sequence does not become a mapping of the multi-level code sequence.

Further, in a similar manner, respective component parts included in the above described data receiving apparatus may be regarded as a data receiving method for receiving information data which is encrypted by using predetermined key information, and performing secret communication with a transmitting apparatus. That is, the data receiving method includes: a multi-level code generation step of generating, based on the predetermined key information, a multi-level code sequence in which a signal level changes so as to be approximately random numbers; a multi-level code conversion step of converting the multi-level code sequence into a converted multi-level code sequence; a demodulation step of demodulating, in a predetermined demodulation method, a modulated signal received from the transmitting apparatus, and outputting a multi-level signal having a plurality of levels each corresponding to a combination of the information data and the converted multi-level code sequence; and a decision step of deciding which is the information data from the multi-level signal in accordance with the converted multi-level code sequence. The multi-level code conversion step irreversibly converts the multi-level code sequence such that the converted multi-level code sequence does not become a mapping of the multi-level code sequence.

As above described, according data communication apparatus and the data communication method of the present invention, the multi-level code conversion section irreversibly converts the multi-level code sequence, and generates the converted multi-level code sequence, whereby it is possible to increase the number of patterns of the multi-level code sequence which the eavesdropper may estimate in accordance with the converted multi-level code sequence. Accordingly, it is possible to increase time required for decryption of cipher text, and also possible to realize highly secret data communication.

Further, according to the data communication apparatus and the data communication method of the present invention, a plurality of the multi-level code generation sections are provided, and the multi-level code conversion section generates the converted multi-level code sequence from a plurality of multi-level code sequences. Therefore, a generation rate of the converted multi-level code sequence will not be lowered. Accordingly, it is possible to prevent a transmission rate of the information data from being reduced depending on the generation rate of the converted multi-level code sequence.

Further, according to the data communication apparatus and the data communication method of the present invention, the multi-level code conversion section is constituted of the accumulation section, whereby an effect (a possibility) of the erroneous multi-level decision, which occurs at the time of reception by the eavesdropper, increases. Accordingly, the possible receiving patterns to be considered at the time of cipher decryption increases. As a result, high security in the cipher communication can be ensured.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2A is a diagram showing an exemplary process of generating a converted multi-level code sequence 13 by using irreversible conversion;

FIG. 2B is a diagram illustrating a decryption process of the converted multi-level code sequence 13 by an eavesdropper;

FIG. 3A is a diagram illustrating a process of generating the converted multi-level code sequence 13 on a plurality of symbols basis;

FIG. 3B is a diagram illustrating a decryption process, performed by the eavesdropper, of the converted multi-level code sequence 13 generated on the plurality of symbols basis;

FIG. 6 is a block diagram showing an exemplary configuration of a multi-level code generation section 111;

DESCRIPTION OF THE PREFERRED EMBODIMENTS

First Embodiment

Figure 1:
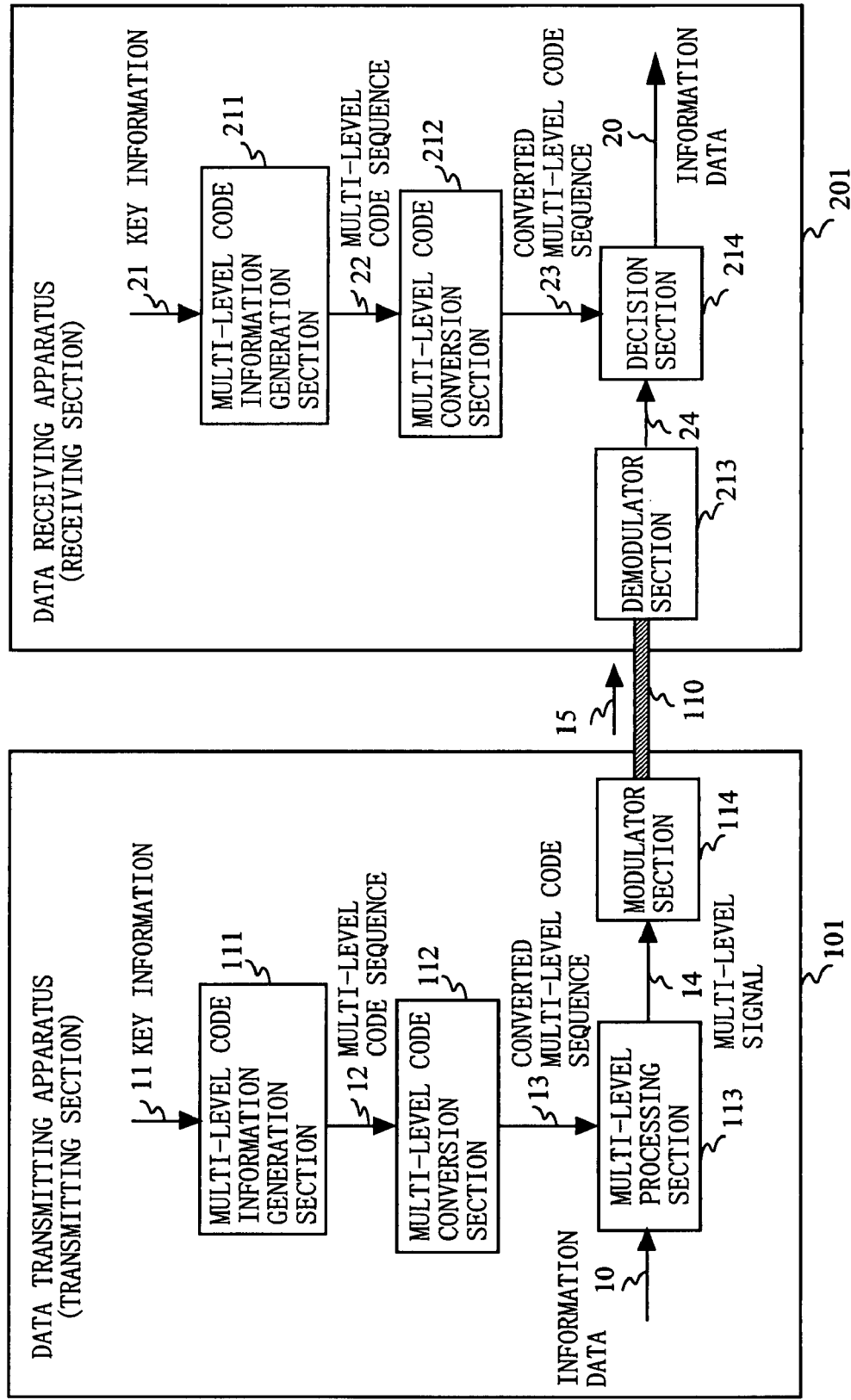
FIG. 1 is a block diagram showing an exemplary configuration of the data communication apparatus 1 according to a first embodiment of the present invention.

FIG. 1 is a block diagram showing an exemplary configuration of a data communication apparatus 1 according to a first embodiment of the present invention. As shown in FIG. 1, the data communication apparatus 1 has a configuration in which a data transmitting apparatus 101 (hereinafter referred to as a transmitting section 101) and a data receiving apparatus 201 (hereinafter referred to as a receiving section 201) are connected to each other via a transmission line 110. The transmitting section 101 includes a multi-level code generation section 111, a multi-level code conversion section 112, a multi-level processing section 113, and a modulator section 114. The receiving section 201 includes a multi-level code generation section 211, a multi-level code conversion section 212, a decision section 214, and a demodulator section 213. As the transmission line 110, a metal line such as a LAN cable or a coaxial line, or an optical waveguide such as an optical-fiber cable can be used. Further, the transmission line 110 is not limited to a wired cable such as the LAN cable, but can be free space which enables a wireless signal to be transmitted. Further, the transmitting section 101 previously retains key information 11, and the receiving section 201 previously retains key information 21. The key information 11 is the same in content as the key information 21.

In the transmitting section 101, the multi-level code generation section 111 generates, based on the key information 11, a multi-level code sequence 12 which is a multi-level pseudo random number series having M values from "0" to "M−1". The multi-level code sequence 12 is inputted to the multi-level code conversion section 112. The multi-level code conversion section 112 irreversibly converts the multi-level code sequence 12 in accordance with a predetermined rule, and outputs a converted multi-level code sequence 13. Here, the irreversible conversion is indicative of conversion which does not establish one-to-one correspondence between the multi-level code sequence 12 and the converted multi-level code sequence 13. That is, the converted multi-level code sequence 13 does not become a mapping of the multi-level code sequence 12.

To the multi-level processing section 113, the information data 10 and the converted multi-level code sequence 13 are inputted. The multi-level processing section 113 combines the information data 10 and the converted multi-level code sequence 13 in accordance with a predetermined procedure, and generates a multi-level signal 14 having a level corresponding to a combination of the information data 10 and the converted multi-level code sequence 13. The modulator section 114 modulates the multi-level signal 14 in a predetermined modulation method, and outputs a modulated signal to the transmission line 110. Here, the predetermined modulation method represents an amplitude modulation method, a frequency modulation method, a phase modulation method, or light-intensity modulation method, for example.

In the receiving section 201, the demodulator section 213 demodulates, in a predetermined demodulation method, the modulated signal 15 having been transmitted via the transmission line 110, and reproduces a multi-level signal 24. Here, the predetermined demodulation method represents a method corresponding to the predetermined modulation method adopted by the modulator section 114. The multi-level code generation section 211 generates, based on the key information 21, a multi-level code sequence 22, which is a multi-level pseudo random number series. An operation of the multi-level code generation section 211 is the same as that of the multi-level code generation section 111 included in the transmitting section 101. The multi-level code conversion section 212 irreversibly converts the multi-level code sequence 22 in accordance with a predetermined rule, and outputs a converted multi-level code sequence 23. Note that an operation of the multi-level code conversion section 212 is the same as that of the multi-level code conversion section 112 included in the transmitting section 101. The decision section 214 decides the multi-level signal 24 (binary decision) in accordance with the converted multi-level code sequence 23, and outputs a result of the decision as information data 20.

Next, a case will be considered where an eavesdropper identifies the key information 11 and 21 by incidentally obtaining correct levels of the multi-level signals 14 and 24 over a long period of time and by using mathematical algorithm, the case being indicative of a conventional constitutional problem. In such a case, a procedure of the eavesdropper identifying the key information will be described below. The eavesdropper first attempts identification of the converted multi-level code sequences 13 and 23 in accordance with the levels of the received multi-level signals 14 and 24. Next, the eavesdropper attempts identification of the multi-level code sequences 12 and 22 by performing an inverse operation on the converted multi-level code sequences 13 and 23. Finally, the eavesdropper attempts identification of the key information 11 and 21 by applying the mathematical algorithm for identifying a pseudo random number sequence of each of the multi-level code sequences 12 and 22. However, in the present invention, conversion processing for generating the converted multi-level code sequences 13 and 23 from the multi-level code sequences 12 and 22 is performed in an irreversible manner. Therefore, the eavesdropper cannot perform the inverse operation, that is, conversion from the converted multi-level code sequences 13 and 23 to the multi-level code sequences 12 and 22, uniquely.

Here, a process of generating the converted multi-level code sequences 13 and 23 by using the irreversible conversion will be described with reference to FIG. 2A. Since the multi-level code conversion section 111 and the multi-level code conversion section 212 perform an identical operation to each other, a process of the multi-level code conversion section 111 generating the converted multi-level code sequence 13 will be described here as a representative example. FIG. 2A is a diagram showing an exemplary process of generating the converted multi-level code sequence 13 by using the irreversible conversion. Note that a multi-level number of the multi-level code sequence 12 is 8 (M=8). As shown in FIG. 2A, the multi-level code conversion section 111, for example, subtracts a predetermined value (subtracts 3, in this case) from seven symbols of the multi-level code sequence 12 {0, 1, 2, 3, 4, 5, 6}, and calculates an absolute value of each of seven symbols of the multi-level code sequence 12 after having 3 subtracted therefrom, thereby generating the converted multi-level code sequence 13 {3, 2, 1, 0, 1, 2, 3}.

In this case, correspondence is made such that a value of the multi-level code sequence 12 which corresponds to a value "3" of the converted multi-level code sequence 13 is "0" or "6", and a value of the multi-level code sequence 12 which corresponds to a value "2" of the converted multi-level code sequence 13 is "1" or "5". The receiving section 201 (i.e. a legitimate receiving party) generates the converted multi-level code sequence 23 from the multi-level code sequence 22 in accordance with a similar process, and thus it is possible to decode the information data 20 from the multi-level signal 24.

Hereinafter, a process of decrypting the converted multi-level code sequence 13 by the eavesdropper will be described, on the assumption that the eavesdropper have obtained the correct converted multi-level code sequence 12 from the multi-level signal 14. FIG. 2B is a diagram illustrating the decryption of the converted multi-level code sequence 13 by the eavesdropper. As shown in FIG. 2B, candidates for the multi-level code sequence 12 to be assumed by the eavesdropper are all combinations of ({0 or 6}, {1 or 5}, {2 or 4}, 3, {2 or 4}, {1 or 5}, {0 or 6}), that is, 64 patterns. Therefore, in order to identify the key information 11 by decrypting the converted multi-level code sequence 13, the eavesdropper needs to apply the mathematical algorithm to these 64 patterns of the multi-level code sequence 12. Accordingly, computational complexity required for the decryption is increased.

In the above description, although the multi-level code conversion section 112 converts the multi-level code sequence 12 into the converted multi-level code sequence 13 on a symbol-by-symbol basis, the converted multi-level code sequence 13 may be converted on a plurality of symbols basis. FIG. 3A is a diagram illustrating a process of generating the converted multi-level code sequence 13 on the plurality of symbols basis. In this case, the multi-level number of the multi-level code sequence 12 is 8 (M=8). As shown in FIG. 3A, the multi-level code conversion section 112 adds every adjoining two symbols of the multi-level code sequence 12 {6, 3, 7, 2, 5, 1} together so as to generate the converted multi-level code sequence 13 {9, 9, 6}. Since the receiving section 201 (i.e. the legitimate receiving party) generates the converted multi-level code sequence 23 from the multi-level code sequence 22 in accordance with a similar process, it is possible to decode the information data 20 from the multi-level signal 24.

Here, the decryption of the converted multi-level code sequence 13 by the eavesdropper will be described, on the assumption that the eavesdropper have obtained the correct converted multi-level code sequence 12 which is generated based on the multi-level signal 14 on the plurality of symbols basis. FIG. 3B is a diagram showing a decryption process, performed by the eavesdropper, of the converted multi-level code sequence 13 generated on the plurality of symbols basis. As shown in FIG. 3B, candidates for the multi-level code sequence 12 to be assumed by the eavesdropper are six patterns of {(2,7), (3,6), (4,5), (5, 4), (6, 3), (7, 2)} with respect to a value "9" of the converted multi-level code sequence 13, and seven patterns of {(0, 6), (1, 5), (2, 4), (3, 3), (4, 2), (5, 1), (6, 0)} with respect to a value "6" of the converted multi-level code sequence 13. Accordingly, in order to identify the key information 11, the eavesdropper needs to apply the mathematical algorithm to all 6×6×7=252 patterns of multi-level code sequence 12 so as to generate the converted multi-level code sequence 13 {9, 9, 6}. That is, the computational complexity required for the decryption is further increased.

The number of symbols of the multi-level code sequence 12 used for generating the converted multi-level code sequence 13 is increased, whereby the number of the patterns of the multi-level code sequence 12 corresponding to the converted multi-level code sequence 13 is increased. Accordingly the computational complexity required for the decryption by the eavesdropper can be increased. In the above description, although the converted multi-level code sequence 13 is generated by adding symbols of the multi-level code sequence 12, generation of the converted multi-level code sequence 13 is not limited thereto. As long as irreversibility is ensured, an arithmetical operation, a logical operation, or any other mathematical operation is applicable for generating the converted multi-level code sequence 13.

The above description describes the case where the multi-level code conversion section 112 adds symbols of multi-level code sequence 12 on the plurality of symbols basis, and generates the converted multi-level code sequence 13. However, the multi-level code conversion section 112 may generate the converted multi-level code sequence 13 by causing the multi-level code sequence 12 to branch off, delaying one of the branched multi-level code sequence, and combining the delayed one of the divided multi-level code sequence with the other multi-level code sequence. In this case, the multi-level code conversion section 212 included in the receiving section 201 also performs the same operation as the multi-level code conversion section 112.

As above described, in the data communication apparatus 1 according to the first embodiment of the present invention, the multi-level code conversion sections 112 and 212 irreversibly convert the multi-level code sequences 12 and 22, and generate the converted multi-level code sequences 13 and 23, whereby it is possible to increase the number of the patterns of the multi-level code sequences 12 and 22 which are to be assumed by the eavesdropper based on the converted multi-level code sequences 13 and 23. Accordingly, it is possible to realize highly secret data communication which significantly increases time required for decryption of cipher text.

Further, in the data communication apparatus 1, the multi-level code conversion sections 112 and 212, respectively, convert the multi-level code sequences 12 and 22, on the plurality of symbols basis, into the converted multi-level code sequences 13 and 23. Therefore, it is possible to increase the number of the patterns of the multi-level code sequences 12 and 22 to be assumed by the eavesdropper based on the converted multi-level code sequences 13 and 23, respectively. Accordingly, it is possible to realize highly secret data communication which significantly increases the time required for the decryption of the cipher text.

Second Embodiment

Figure 4:
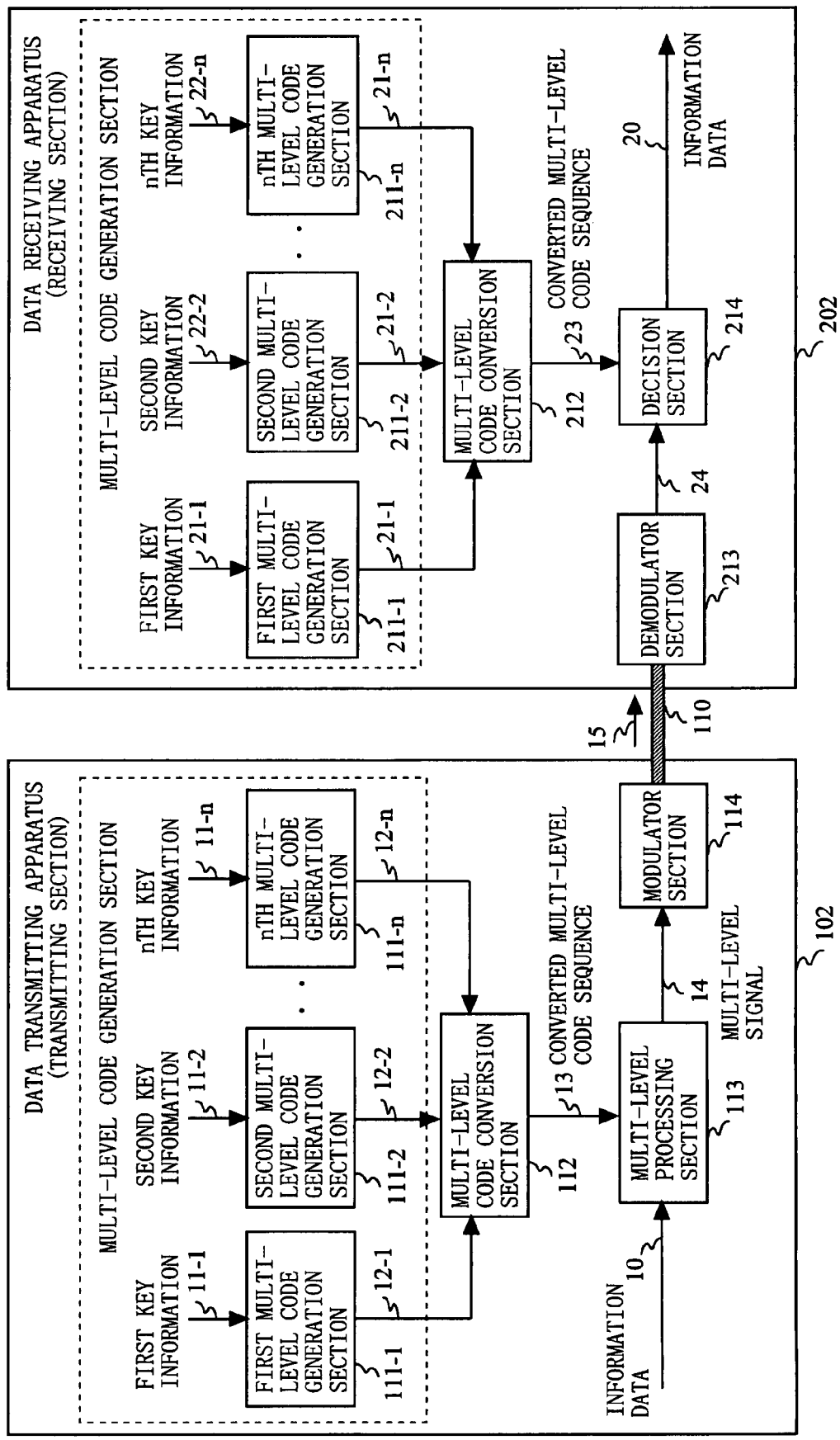
FIG. 4 is a block diagram showing an exemplary configuration of a data communication apparatus 2 according to a second embodiment of the present invention.

FIG. 4 is a block diagram showing an exemplary configuration of a data communication apparatus 2 according to a second embodiment of the present invention. Hereinafter, details described in the first embodiment will be omitted, and those which are different from the first embodiment will be described in detail. As shown FIG. 4, the data communication apparatus 2 has a configuration in which a data transmitting apparatus 102 (hereinafter referred to as a transmitting section 102) and a data receiving apparatus 202 (hereinafter referred to as a receiving section 202) are connected to each other via the transmission line 110. The transmitting section 102 includes a first to an nth multi-level code generation sections 111-1 to 111-$n$, and a multi-level code conversion section 112, a multi-level processing section 113, and a modulator section 114. The receiving section 202 includes a first to an nth multi-level code generation sections 211-1 to 211-$n$, a multi-level code conversion section 212, a decision section 214, and a demodulator section 213. Note that "n" is a given integer of 2 or more.

In the transmitting section 102, the first to the nth multi-level code generation sections 111-1 to 111-$n$, respectively, output a first to an nth multi-level code sequences 12-1 to 12-$n$ in accordance with first to nth key information 11-1 to 11-$n$. It may be possible to regard the entire configuration of the first to the nth multi-level code generation sections 111-1 to 111-$n$ as one multi-level code generation section. In such a case, the multi-level code generation section outputs the first to the nth multi-level code sequences 12-1 to 12-$n$ in accordance with the first to the nth key information 11-1 to 11-$n$.

The first to the nth multi-level code sequences 12-1 to 12-$n$ are inputted to the multi-level code conversion section 112. The multi-level code conversion section 112 generates, based on the first to the nth multi-level code sequences 12-1 to 12-$n$, a converted multi-level code sequence 13. A method of generating the converted multi-level code sequence 13 by the multi-level code conversion section 112 is similar to that described in the first embodiment. Here, an advantage of generating the converted multi-level code sequence 13 from a plurality of the multi-level code sequences 12-1 to 12-$n$ will be described. In the first embodiment, in the case where the converted multi-level code sequence 23 is generated on the plurality of symbols basis, a generation rate of the converted multi-level code sequence 23 is lowered, and a transmission rate of the information data 10 may be reduced depending on the generation rate of the converted multi-level code sequence 23. However, in the present embodiment, the multi-level code conversion section 112 generates the converted multi-level code sequence 23 in accordance with the first to the nth multi-level code sequences 12-1 to 12-$n$, whereby the generation rate of the converted multi-level code sequence 23 will not be lowered, or the transmission data of the information data 10 will not be reduced depending on the generation rate of the converted multi-level code sequence 23.

Further, in the receiving section 202, operations of the first to the nth multi-level code generation sections 211-1 to 211-$n$ and the multi-level code conversion section 212 are the same as those in the transmitting section 102.

Figure 5:
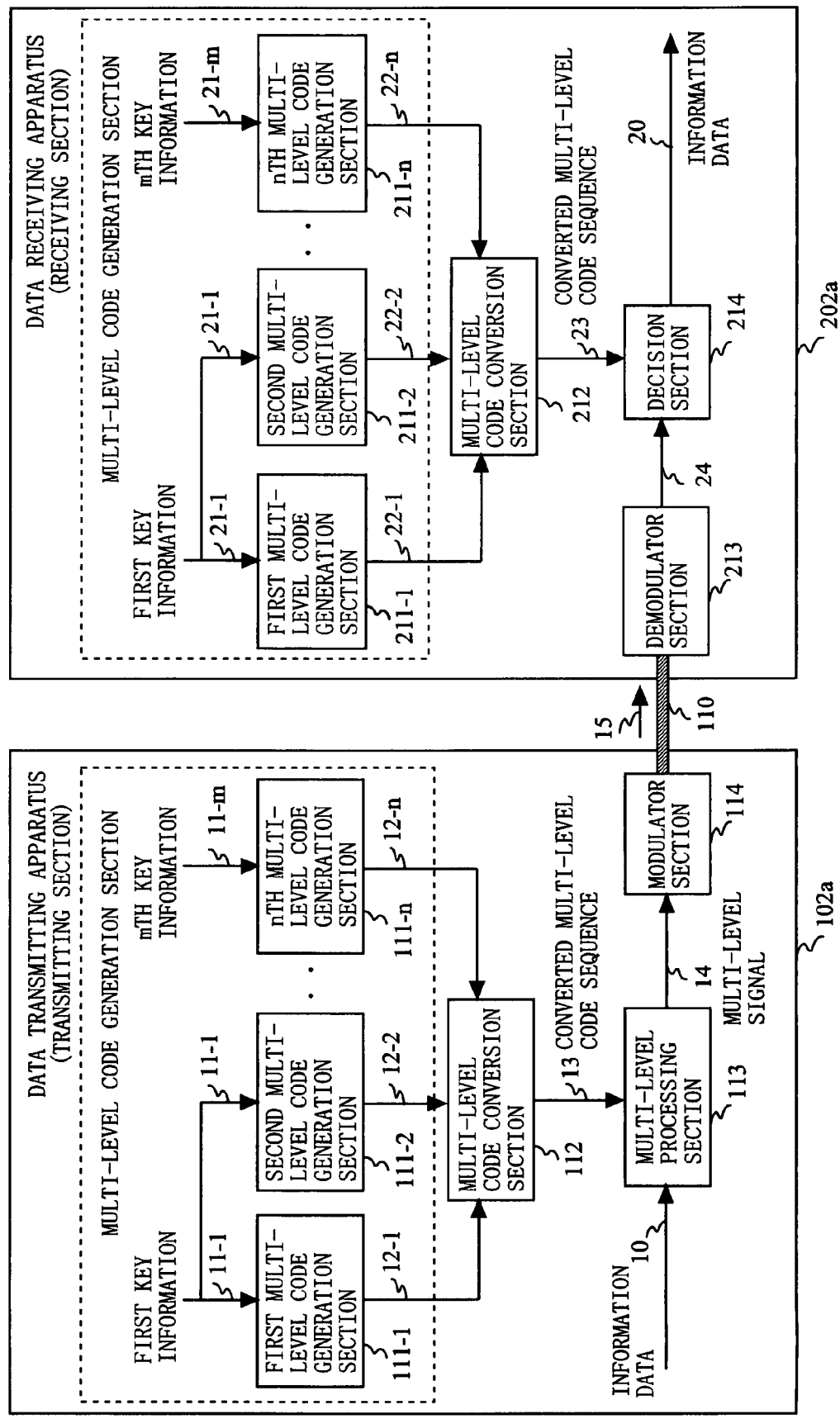
FIG. 5 is a block diagram showing an exemplary configuration of a data communication apparatus 2a according to the second embodiment of the present invention.

Further, a data communication apparatus 2$a$ according to the present embodiment may have a configuration different from the above-described configuration. FIG. 5 is a block diagram showing an exemplary configuration of a data communication apparatus 2$a$ according to the second embodiment of the present invention. As shown in FIG. 5, the transmitting section 102$a$ inputs first to mth ("m" is an integer satisfying m<n) key information 11-1 to 11-$m$ to the first to the nth multi-level code generation sections 111-1 to 111-$n$, while allowing an overlapped input of some of the first to mth key information so as to decrease the number of the key information to be used for cipher communication. Accordingly, it is possible to simplify sharing of the key information 11 between a transmitting end and a receiving end.

Further, a plurality of the multi-level code generation sections 111, to which common key information 11 is inputted, outputs a plurality of the multi-level code sequences 12 which is different from one another. Accordingly, the plurality of the multi-level code generation sections become uncorrelated with one another, and thus an inverse operation from the converted multi-level code sequence 13 to each of the multi-level code sequences 12 can be complicated. Further, in a similar manner, in the receiving section 202$a$, the key information 21-1 to 21-m may be inputted in an overlapped manner, whereby it is possible to decode information data 20 from a multi-level signal 24.

As above described, the data communication apparatus 2 according to the second embodiment of the present invention includes a plurality of the multi-level code generation sections 111-1 to 111-n, and the multi-level code conversion section 112 generates the converted multi-level code sequence 13 from the plurality of the multi-level code sequences 12-1 to 12-n. Accordingly, the generation rate of the converted multi-level code sequence 13 is not lowered. Therefore, it is possible to prevent the transmission rate of the information data 10 from being lowered depending on the generation rate of the converted multi-level code sequence 13.

The multi-level code generation section 111 according to each of the first and the second embodiments may have a configuration shown in FIG. 6. FIG. 6 is a block diagram showing an exemplary configuration of the multi-level code generation section 111. As shown in FIG. 6, the multi-level code generation section 111 includes a binary random number generation section 111x, and a multi-level generation section 111y. The binary random number generation section 111x generates, based on the key information 11, a binary random number sequence which changes so as to be approximately random numbers. The multi-level generation section 111y processes the binary random number sequence with predetermined multi-level processing and outputs the multi-level code sequence 12. According to this configuration, the multi-level code generation section 111 changes a method of multi-level generation by the multi-level generation section 111y, that is, a mapping method between the binary random number sequence. Accordingly, it is possible to change the multi-level number of the multi-level code sequence 12, and the multi-level code sequences 12 to be generated based on the common key information 11.

Third Embodiment

Figure 7:
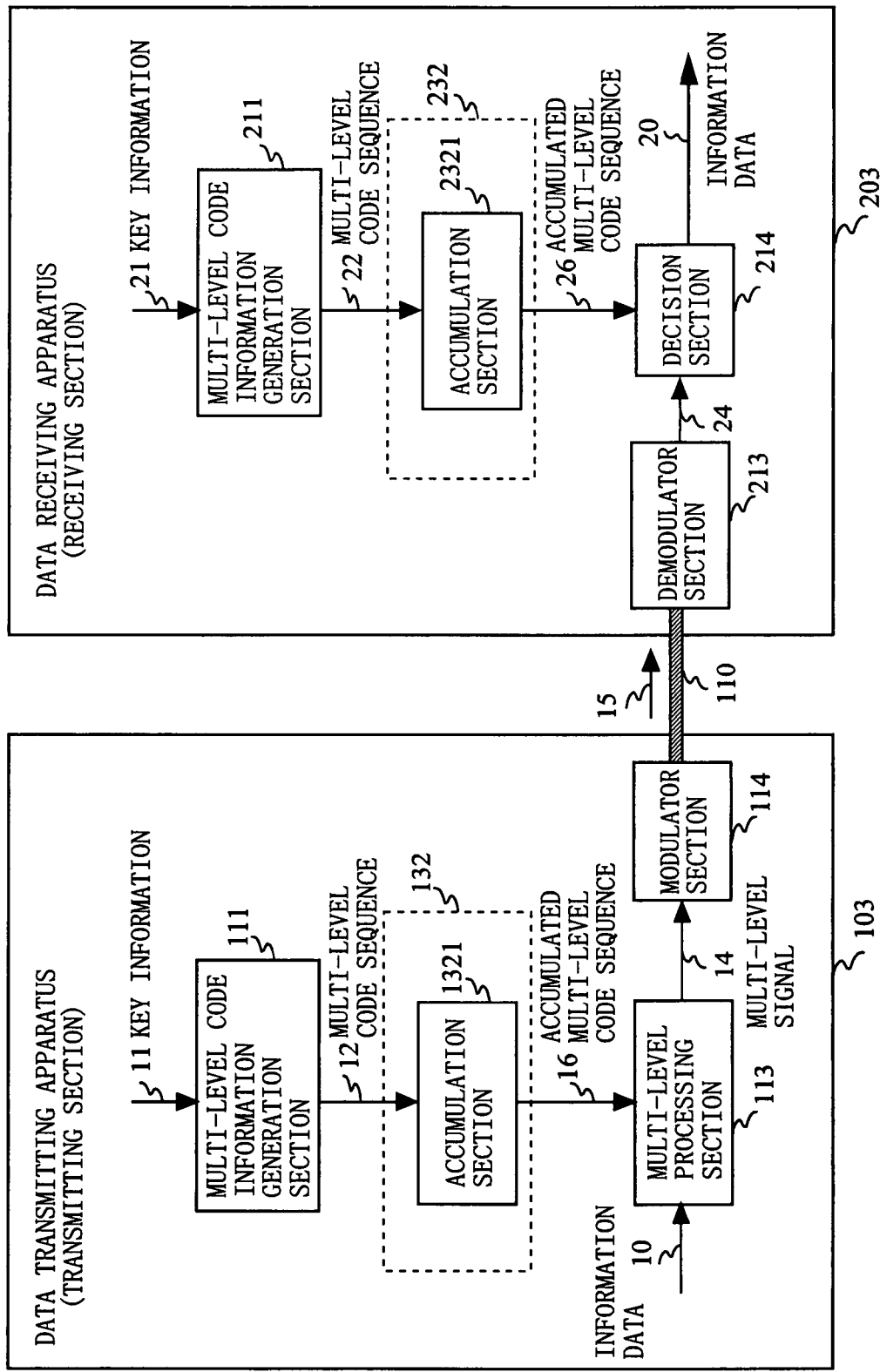
FIG. 7 is a block diagram showing an exemplary configuration of the data communication apparatus 3 according to a third embodiment of the present invention.

FIG. 7 is a block diagram showing an exemplary configuration of the data communication apparatus 3 according to a third embodiment of the present invention. As shown in FIG. 7, the data communication apparatus 3 has a configuration in which a data transmitting apparatus 103 (hereinafter referred to as a transmitting section 103) and a data receiving apparatus 203 (hereinafter referred to as a receiving section 203) are connected to each other via the transmission line 110. The transmitting section 103 includes a multi-level code generation section 111, a multi-level code conversion section 132, a multi-level processing section 113, and a modulator section 114. The receiving section 203 includes a multi-level code generation section 211, a multi-level code conversion section 232, a demodulator section 213, and a decision section 214. The multi-level code conversion section 132 is constituted of an accumulation section 1321, and the multi-level code conversion section 232 is constituted of an accumulation section 2321.

Hereinafter, an operation of the data communication apparatus 3 will be described. First, an operation of the transmitting section 103 will be described. The multi-level code generation section 111 generates, based on the key information 11, a multi-level code sequence 12 which is a multi-level pseudo random number series having m values from "0" to "m−1" (m is an integer of 2 or more). The multi-level code sequence 12 is inputted to the multi-level code conversion section 132. In the multi-level code conversion section 132, the accumulation section 1321 performs accumulation of the values of the multi-level code sequence 12, the accumulation being described later in detail, and outputs the accumulated values as an accumulated multi-level code sequence 16. In the present embodiment, the accumulated multi-level code sequence 16 is a multi-level code sequence having M values from "0" to "M−1" (M is an integer of 2 or more). To the multi-level processing section 113, the information data 10 transmitted to the transmitting section 203, and the accumulated multi-level code sequence 16 are inputted. The multi-level processing section 113 generates, based on a signal format shown in FIG. 16, a multi-level signal 14 having a level corresponding to a combination of the information data 10 and the accumulated multi-level code sequence 16. The modulator section 114 modulates the multi-level signal 14 in a predetermined modulation method, and generates a modulated signal 15 so as to be transmitted to the transmission line 110. Here, the predetermined modulation method is typified by a modulation method such as an amplitude modulation method, a frequency modulation method, a phase modulation method, and a light-intensity modulation method, for example.

Next, an operation of the receiving section 203 will be described. The demodulator section 213 demodulates the modulated signal 15 transmitted thereto via the transmission line 110 in a predetermined demodulation method, and reproduces a multi-level signal 24. Here, the predetermined demodulation method is a demodulation method which corresponds to the modulation method adopted by the modulator section 114. The multi-level code generation section 211 generates, based on the key information 21, a multi-level code sequence 22 which is a pseudo random number series having m values from "0" to "m−1" (m is an integer of 2 or more). Note that an operation of the multi-level code generation section 211 is the same as the operation of the multi-level code generation section 111 included in the transmitting section 103. The multi-level code sequence 22 is inputted to the multi-level code conversion section 232. In the multi-level code conversion section 232, the accumulation section 2321 performs accumulation of values of the multi-level code sequence 22, and outputs the accumulated values as an accumulated multi-level code sequence 26. An operation of the accumulation section 2321 is the same as the operation of the accumulation section 1321 included in the transmitting section 103. In the present embodiment, the multi-level code sequence 26 is a multi-level code sequence having M values from "0" to "M−1". The decision section 214 decides the multi-level signal 24 (binary decision) in accordance with the accumulated multi-level code sequence 26, and outputs a result of the decision as information data 20.

Figure 8:
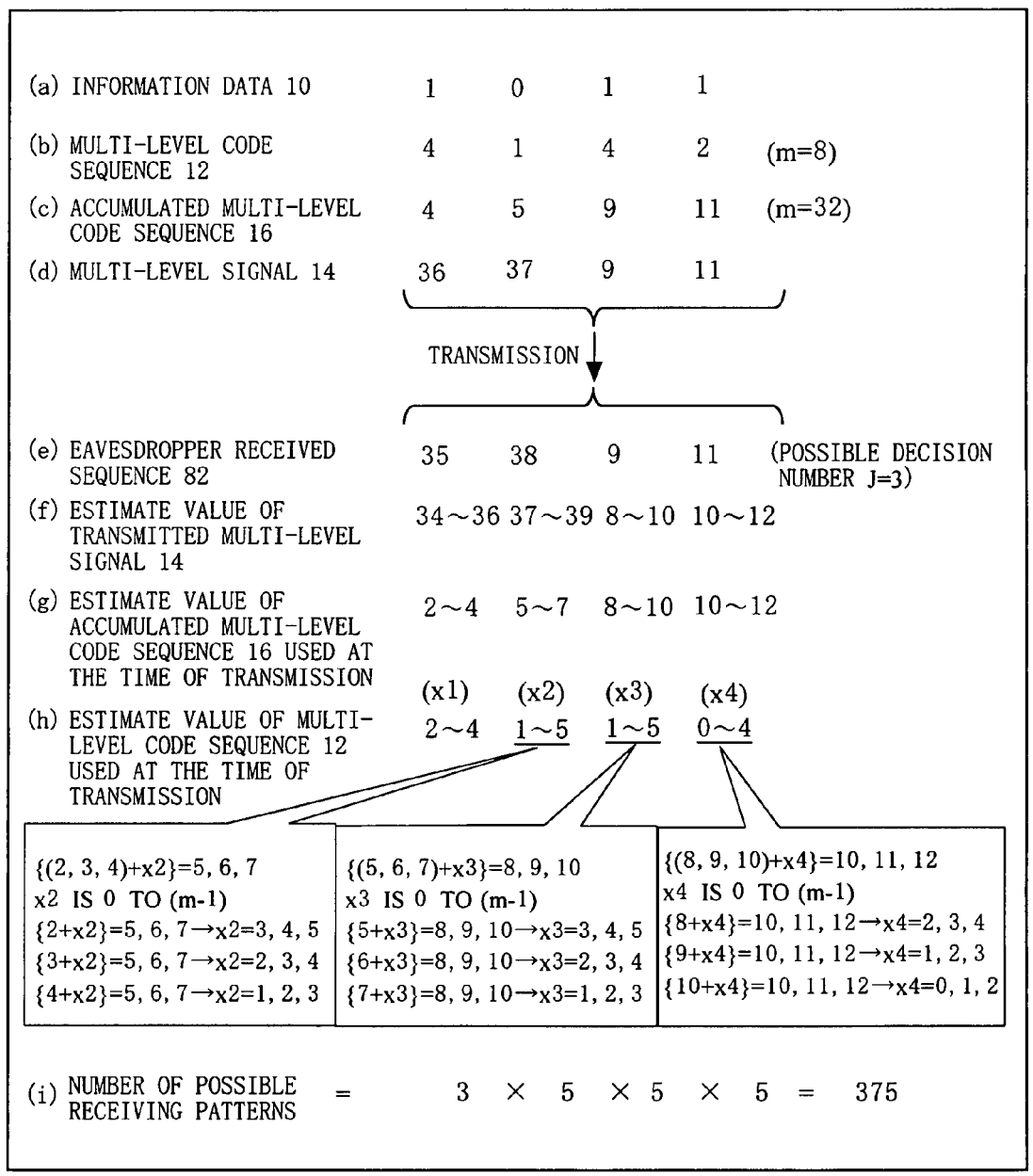
FIG. 8 is a diagram illustrating the number of possible receiving patterns of the data communication apparatus 3 shown in FIG. 7.
Figure 9:
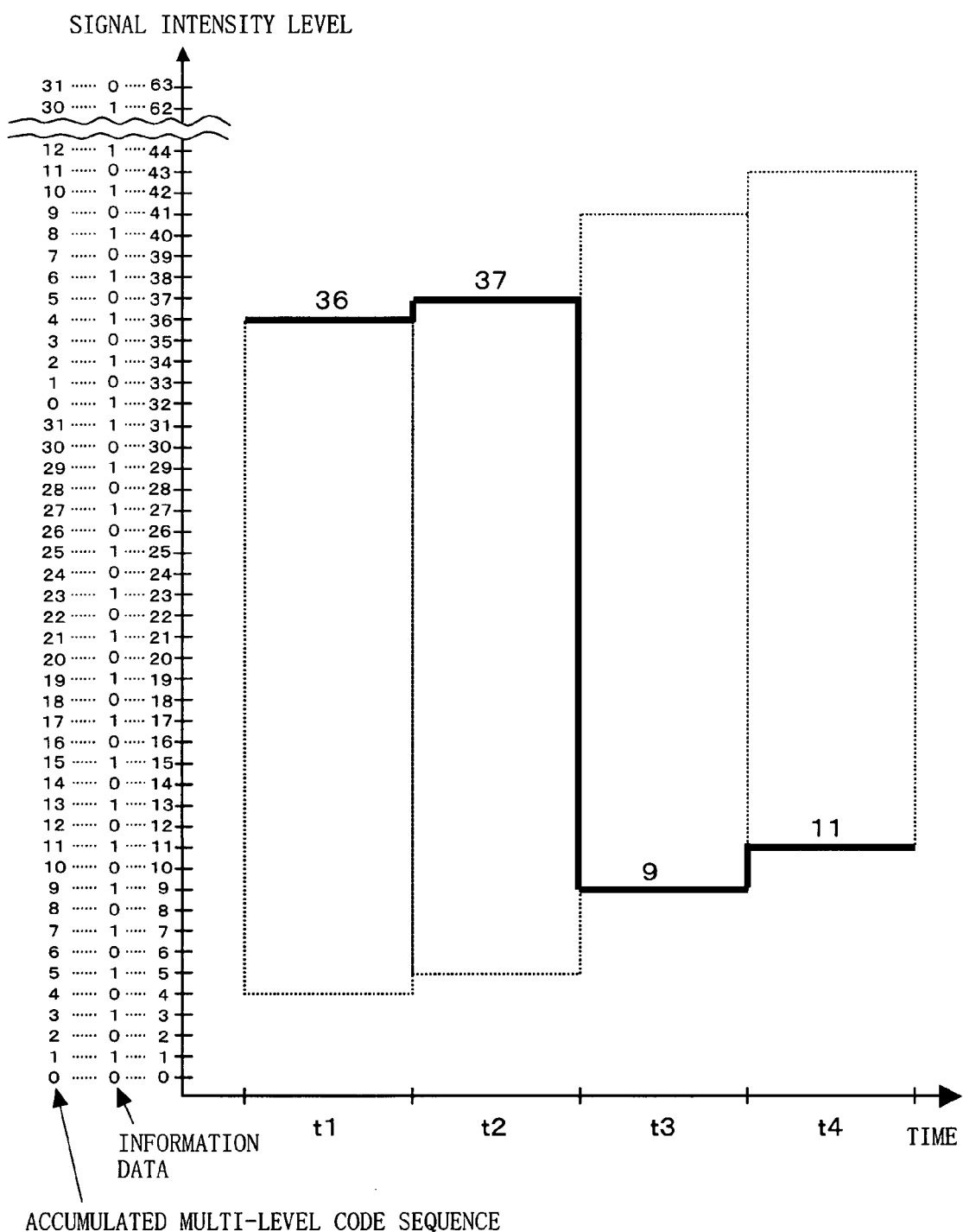
FIG. 9 is a diagram illustrating a multi-level signal 14 shown in FIG. 8(c).
Figure 15:
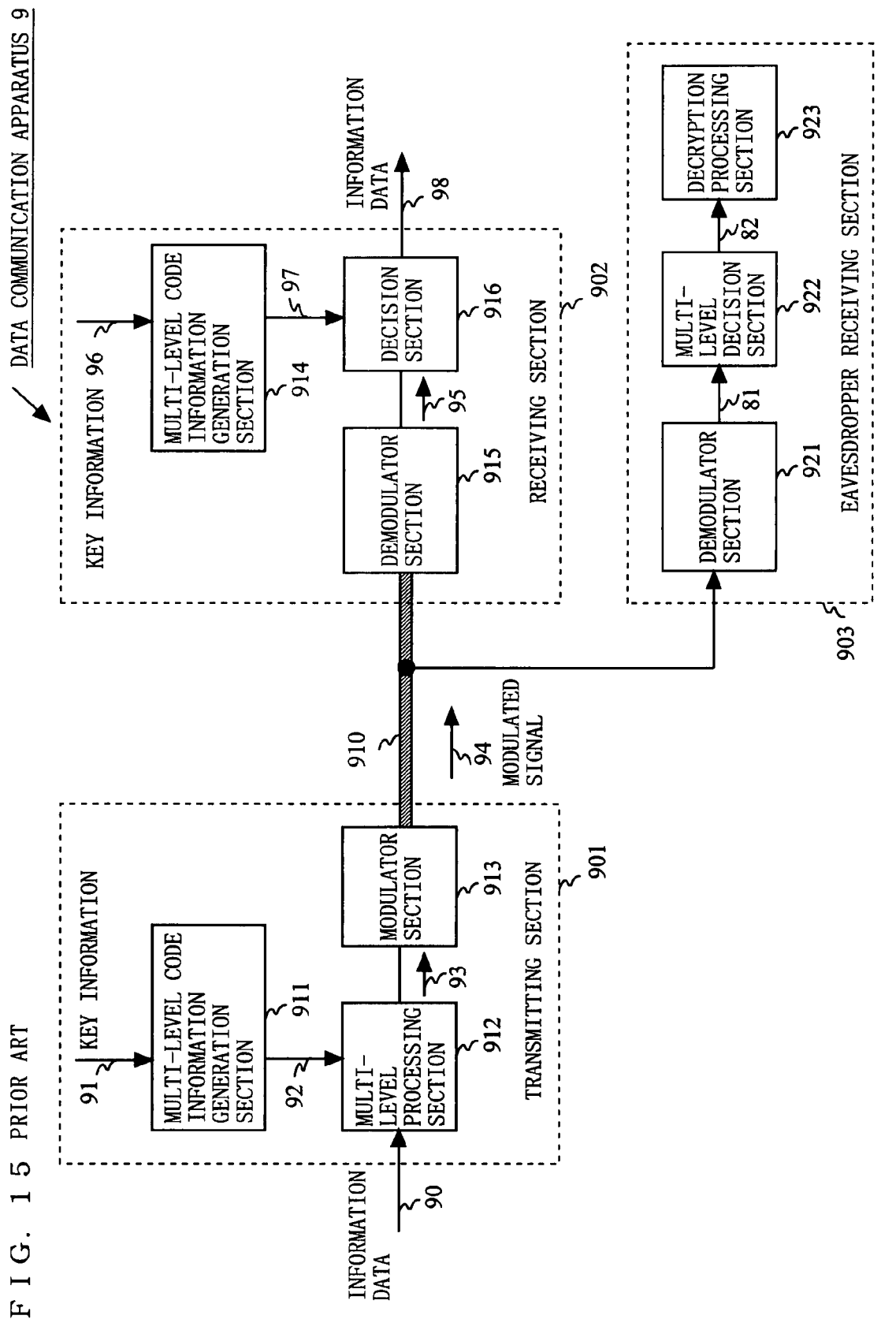
FIG. 15 is a block diagram showing an exemplary configuration of a conventional data communication apparatus 9 using a Y-00 protocol.

Hereinafter, in cipher communication performed by the data communication apparatus 3, the number of possible receiving patterns (the number of attempts required for decryption of the cipher communication) in the case where the eavesdropper is to perform decryption will be described, compared to the conventional data communication apparatus 9 (see FIG. 15). FIG. 8 is a diagram illustrating the number of the possible receiving patterns of the data communication apparatus 3 shown in FIG. 7. FIG. 9 is a diagram illustrating the multi-level signal 14 shown in FIG. 8(d). As shown in (a) and (b) of FIG. 8, an exemplary case will be described where the information data 10 to be inputted to the multi-level processing section 113 included in the transmitting section 103 is constituted of values of {1, 0, 1, 1}, and the multi-level code sequence 12 whose multi-level number m is 8 is constituted of values of {4, 1, 4, 2}.

First, the accumulation section 1321 sequentially accumulates respective values of the multi-level code sequence 12 {4, 1, 4, 2} and generates an accumulated multi-level code sequence 16 constituted of values of {4, 5, 9, 11}. Specifically, the accumulation section 1321 adds a 0th value "0" (since the 0th does not exist, the 0th value is regarded as "0") of the accumulated multi-level code sequence 16 and a first value "4" of the multi-level code sequence 12, and sets a resultant added value as a first value "4" of the accumulated multi-level code sequence 16. In a similar manner, a second value "5" of the accumulated multi-level code sequence 16 is set by adding the first value "4" of the accumulated multi-level code sequence 16 and a second value "1" of the multi-level code sequence 12. A third value "9" of the accumulated multi-level code sequence 16 is set by adding the second value "5" of the accumulated multi-level code sequence 16 and a third value "4" of the multi-level code sequence 12. A fourth value "11" is set by adding the third value "9" of the accumulated multi-level code sequence 16 and a fourth value "2" of the multi-level code sequence 12. In other words, the first value of the accumulated multi-level code sequence 16 corresponds to "0+4=4", and the second value of the accumulated multi-level code sequence 16 corresponds to "0+4+1=5". The third value of the accumulated multi-level code sequence 16 corresponds to "0+4+1+4=9". The fourth value of the accumulated multi-level code sequence 16 corresponds to "0+4+1+4+2=11". In this case the multi-level code sequence 12 is constituted of four values, and satisfies multi-level number m=8. Therefore, the multi-level number M of the accumulated multi-level code sequence 16 corresponds to "4×8=32".

Figure 16:
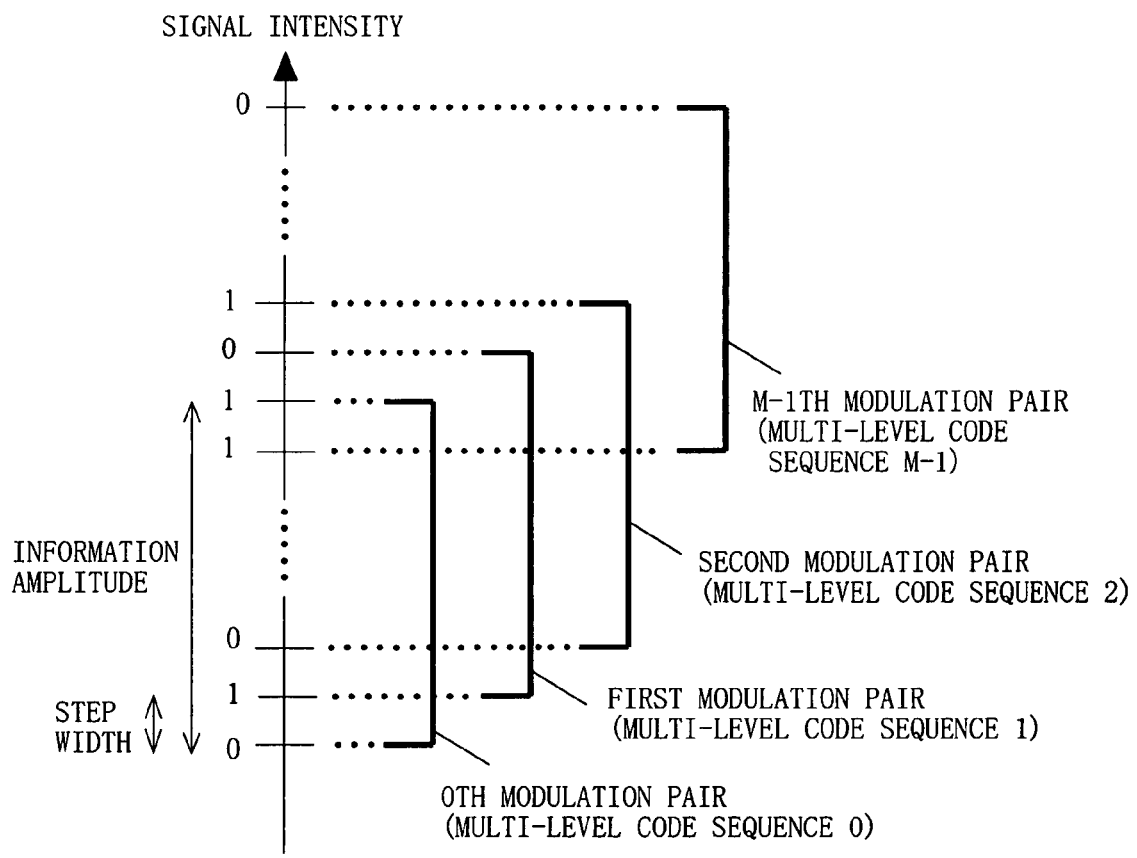
FIG. 16 is a diagram illustrating a signal format of a multi-level signal used by the conventional data communication apparatus 9 using the Y-00 protocol.
Figure 17:
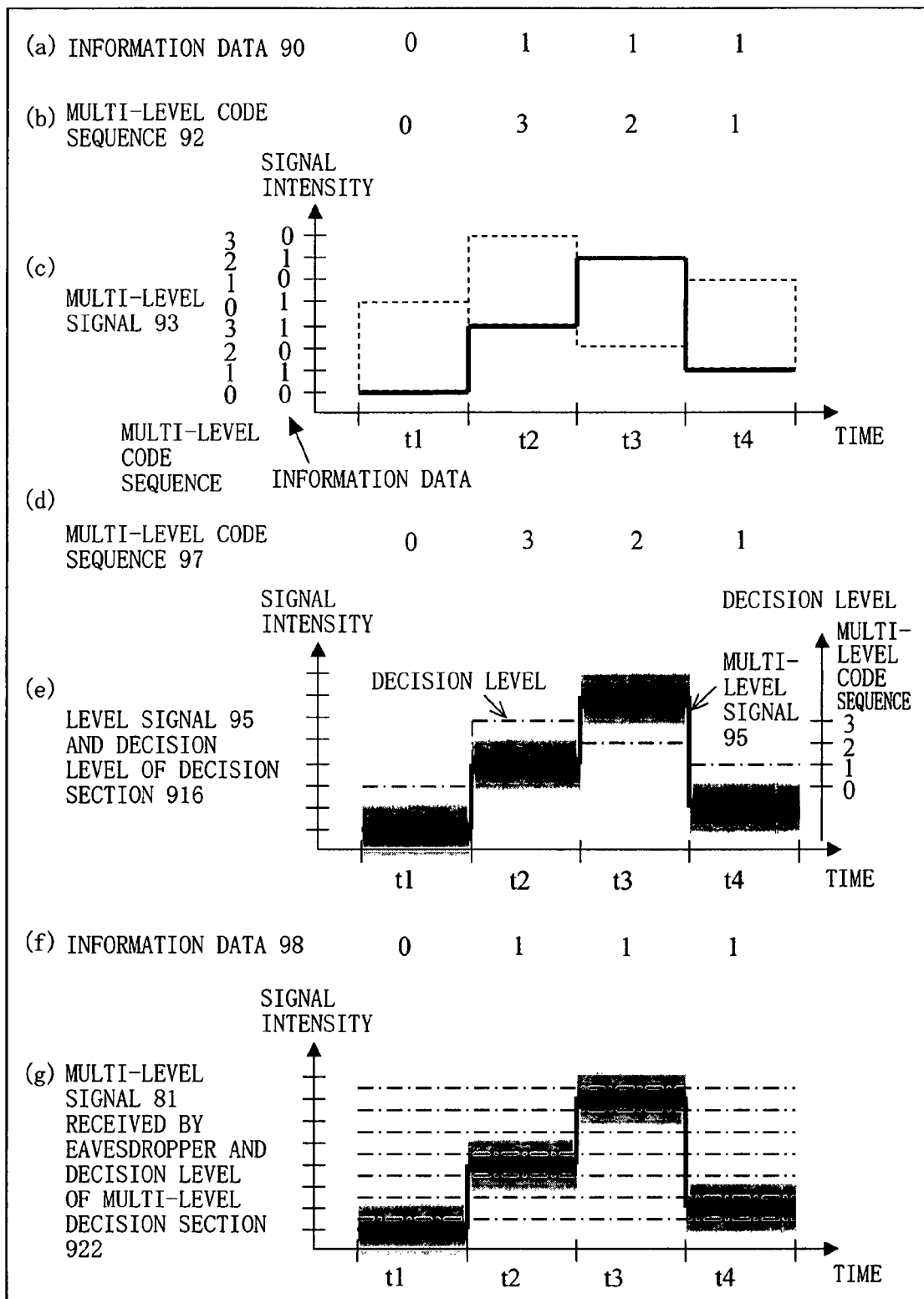
FIG. 17 is a diagram specifically illustrating an operation of the conventional data communication apparatus 9.

Next, to the multi-level processing section 113, the accumulated multi-level code sequence 16 {4, 5, 9, 11} and the information data 10 {1, 0, 1, 1} are inputted, and the multi-level processing section 113 generates a multi-level signal 14 {36, 37, 9, 11} in accordance with a signal format shown in FIG. 16 (see FIGS. 8(*d*) and 9). A specific operation for generating the multi-level signal 14 {36, 37, 9, 11} is the same as that described in the background art, and thus will be omitted. Here, in the case of possible decision number J=3, the eavesdropper receives a modulated signal 15 on the transmission line 110 by using the eavesdropping receiving section 903, performs multi-level decision, and obtains a received sequence 82 {35, 38, 9, 11}, for example (see FIG. 8(*e*)). In consideration of the possible decision number J=3, the eavesdropper can estimate that values of the multi-level signal 14, which is a legitimate transmission signal, will be within respective ranges of {34 to 36, 37 to 39, 8 to 10, 10 to 12} (see FIG. 8(*f*)). The eavesdropper can also estimate, by using the signal format shown in FIG. 16, that the values of the accumulated multi-level code sequence 16 used by the transmitting section 103 will be within respective ranges of {2 to 4, 5 to 7, 8 to 10, 10 to 12} (see FIG. 8(*g*)).

Next, the eavesdropper needs to perform an inverse operation of the accumulation process, which is performed by the accumulation section 1321 included in the transmitting section 103, so as to derive the multi-level code sequence 12 using estimate values {2 to 4, 5 to 7, 8 to 10, 10 to 12} of the accumulated multi-level code sequence 16. Here, estimate values of the multi-level code sequence 12 are represented by {x1, x2, 3, x4}. Since the multi-level number m of the multi-level code sequence 12 is 8, each of the x1, x2, x3, and x4 is any integer from 0 to 7. According to this, the first value "2 to 4" of the accumulated multi-level code sequence 16 corresponds to an addition between the 0th value "0" of the accumulated multi-level code sequence 16 and "x1". Accordingly, the eavesdropper can estimate that x1 is any one value within the range of "2 to 4". In a similar manner, the second value "5 to 7" of the accumulated multi-level code sequence 16 corresponds to an addition between the first value "2 to 4" of the accumulated multi-level code sequence 16 and "x2". Accordingly, the eavesdropper can estimate that x2 is any one value within the range of "1 to 5". The third value "8 to 10" of the accumulated multi-level code sequence 16 corresponds to an addition between the second value "5 to 7" of the accumulated multi-level code sequence 16 and "x3". Accordingly, the eavesdropper can estimate that x3 is any one value within the range of "1 to 5". The fourth value "10 to 12" of the accumulated multi-level code sequence 16 corresponds to an addition between the third value "8 to 10" of the accumulated multi-level code sequence 16 and "x4". Accordingly, the eavesdropper can estimate that x4 is any one value within the range of "0 to 4". In this manner, the eavesdropper can estimate that values of the multi-level code sequence 12 are within the ranges of {2 to 4, 1 to 5, 1 to 5, 0 to 4} (see FIG. 8(*h*)).

Figure 18:
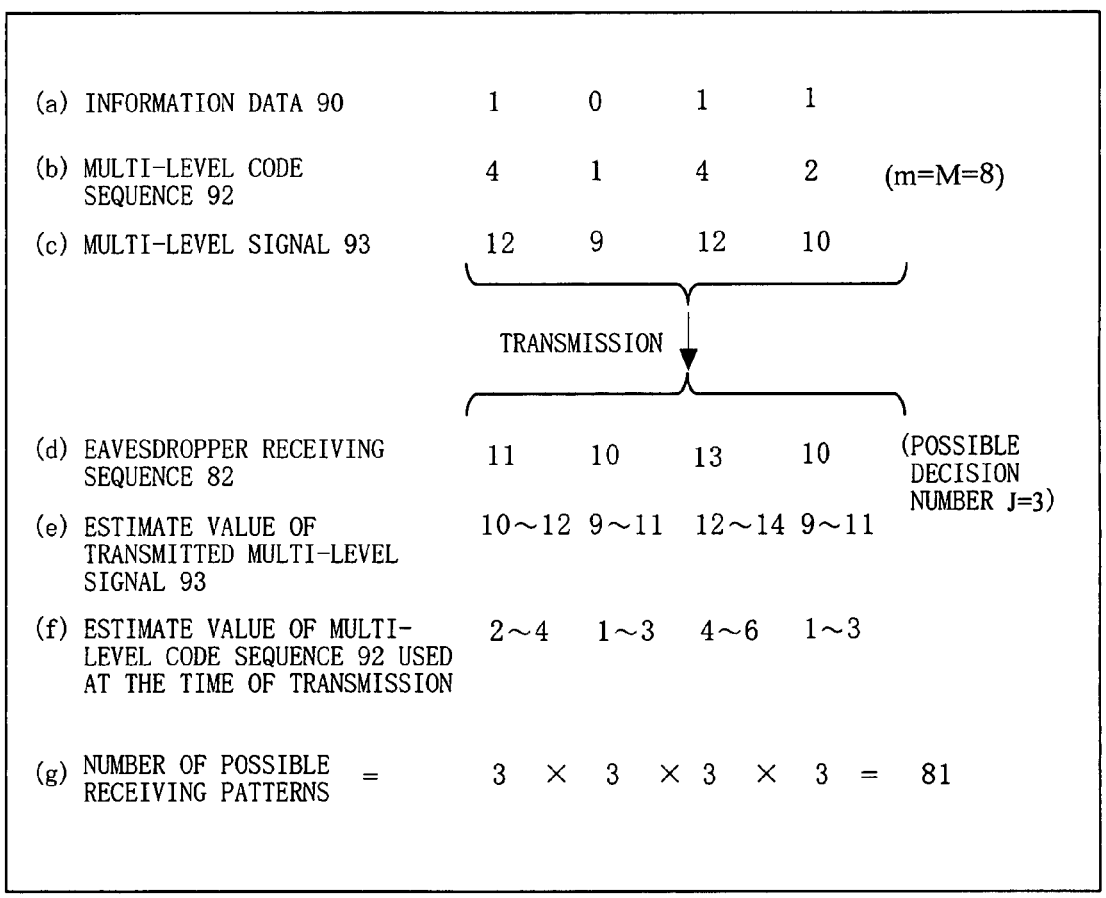
FIG. 18 is a diagram illustrating the number of possible receiving patterns of the conventional data communication apparatus 9 shown in FIG. 15.
Figure 19:
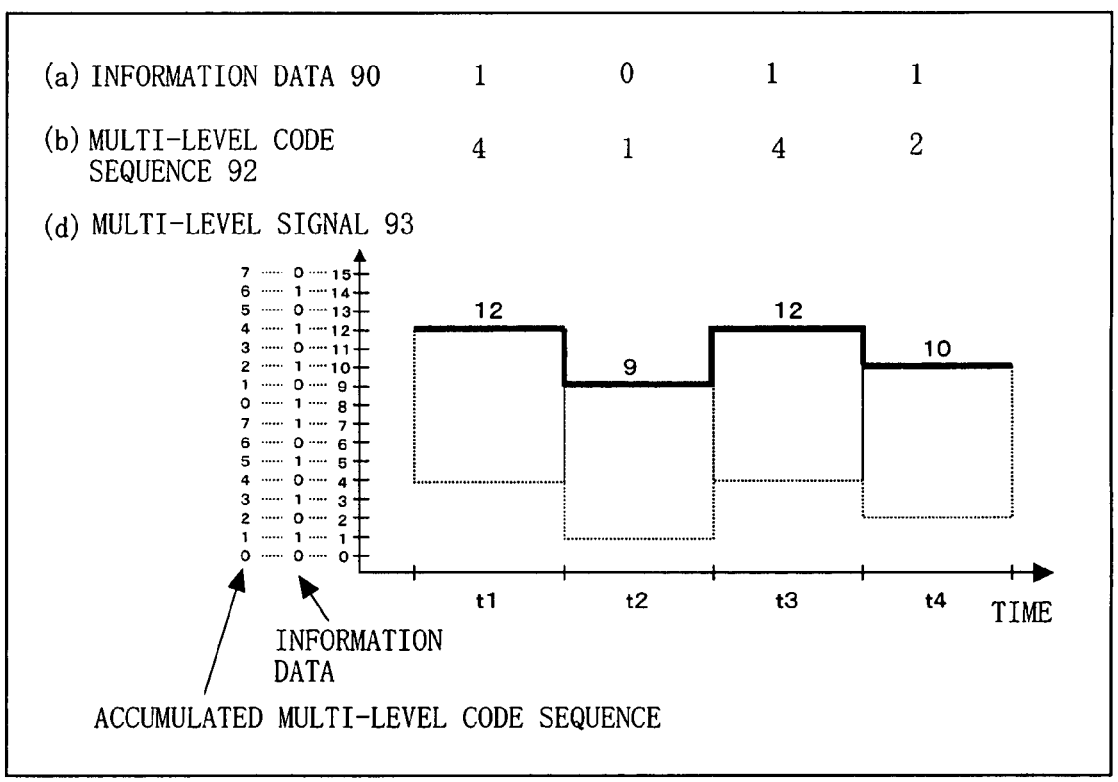
FIG. 19 is a diagram illustrating a multi-level signal 93 shown in FIG. 18(c).

Accordingly, the eavesdropper can narrow the possible values, which the multi-level code sequence 12 may take, down to "3 patterns×5 patterns×5 patters×5 patterns=375 patterns". In other words, the number of attempts of the eavesdropper decrypting the multi-level code sequence 12 becomes a total of 3×5×5×5=375 patterns (see FIG. 8(*i*)). That is, the number of the possible receiving patterns of the data communication apparatus 3 according to the third embodiment is 375, which is significantly increased from the number of the possible receiving patterns of 81 (see FIG. 18(*g*)) in the conventional data communication apparatus 9.

As above described, in the data communication apparatus 3 according to the third embodiment, the accumulation section 1321 which accumulates each of the values of the multi-level code sequence 12 is provided, whereby it is possible to enhance an effect of preventing cipher decryption, the effect being caused by erroneous multi-level decision which occurs when the eavesdropper receives (intercepts) the modulated signal 15. It is also possible to increase the number of the possible receiving patterns. As a result, it is possible to ensure high security in the cipher communication. Further, the receiving section 203 includes the accumulation section 2321 having the same configuration as the accumulation section 1321 included in the transmitting section 103, and thus it is possible to decode the information data 20 which is equal to the information data 10.

In the above description, the accumulation section 1321 adds a value as large as a (k−1)th value (k is a natural number) of the accumulated multi-level code sequence 16 and a kth value of the multi-level code sequence 12, and sets a resultant added value as a kth value of the accumulated multi-level code sequence 16. However, the accumulation section 1321 may calculate the kth value of the accumulated multi-level code sequence 16 by adding a value p times (P is an integer of 2 or more) as large as the (k−1)th value of the accumulated multi-level code sequence 16 and the kth value of the multi-level code sequence 12. Details will be described in a fourth embodiment, and accordingly, it is possible to enhance the effect of preventing cipher decryption, the effect being caused by the erroneous multi-level decision which occurs when the eavesdropper receives (intercepts) the modulated signal 14, and further possible to increase the number of possible receiving patterns.

Further, in the case where a length of the multi-level code sequence 12 having been inputted reaches to a predetermined length (a predetermined bit length), the accumulation section 1321 may reset the accumulated multi-level code sequence 16, which is constituted of the accumulated values of the multi-level code sequence 12, to a predetermined value (for example, "0"). Note that the accumulation section 2321 also performs a similar operation. Accordingly, it is possible to prevent respective values of the accumulated multi-level code sequences 16 and 26 from diverging from each other.

Further, the accumulation section 1321 resets the accumulated multi-level code sequence 16 to a predetermined value (for example, "0") every time each of the values of the accumulated multi-level code sequence 16 becomes a predetermined value or greater, thereby preventing divergence of the respective values of the accumulated multi-level code sequences 16 and 26. In this case, the accumulation section 2321 also performs a similar operation.

Further, the accumulation section 1321 limits the range of the multi-level code sequence 12 to be accumulated to values in a range from an accumulation time point to a predetermined previous time point, whereby it is possible to prevent divergence of the values of the accumulated multi-level code sequence 16. Specifically, the fourth value of the accumulated multi-level code sequence 16 is generated by using the second to the fourth values of the multi-level code sequence 12. In this case, the range of the multi-level code sequence 12 to be accumulated is limited to a range of previous two values from the accumulated time point. In this case, the accumulation section 2321 also performs a similar operation.

Further, the accumulation section 1321 divides the accumulated value of the multi-level code sequence 12 by a predetermined natural number, and outputs a resultant remainder as the accumulated multi-level code sequence 16. Accordingly the accumulation section 1321 can limit the accumulated value to be lower than a predetermined natural number and consequently prevent the divergence. In this case the accumulation section 2321 also performs a similar operation.

Fourth Embodiment

Figure 10:
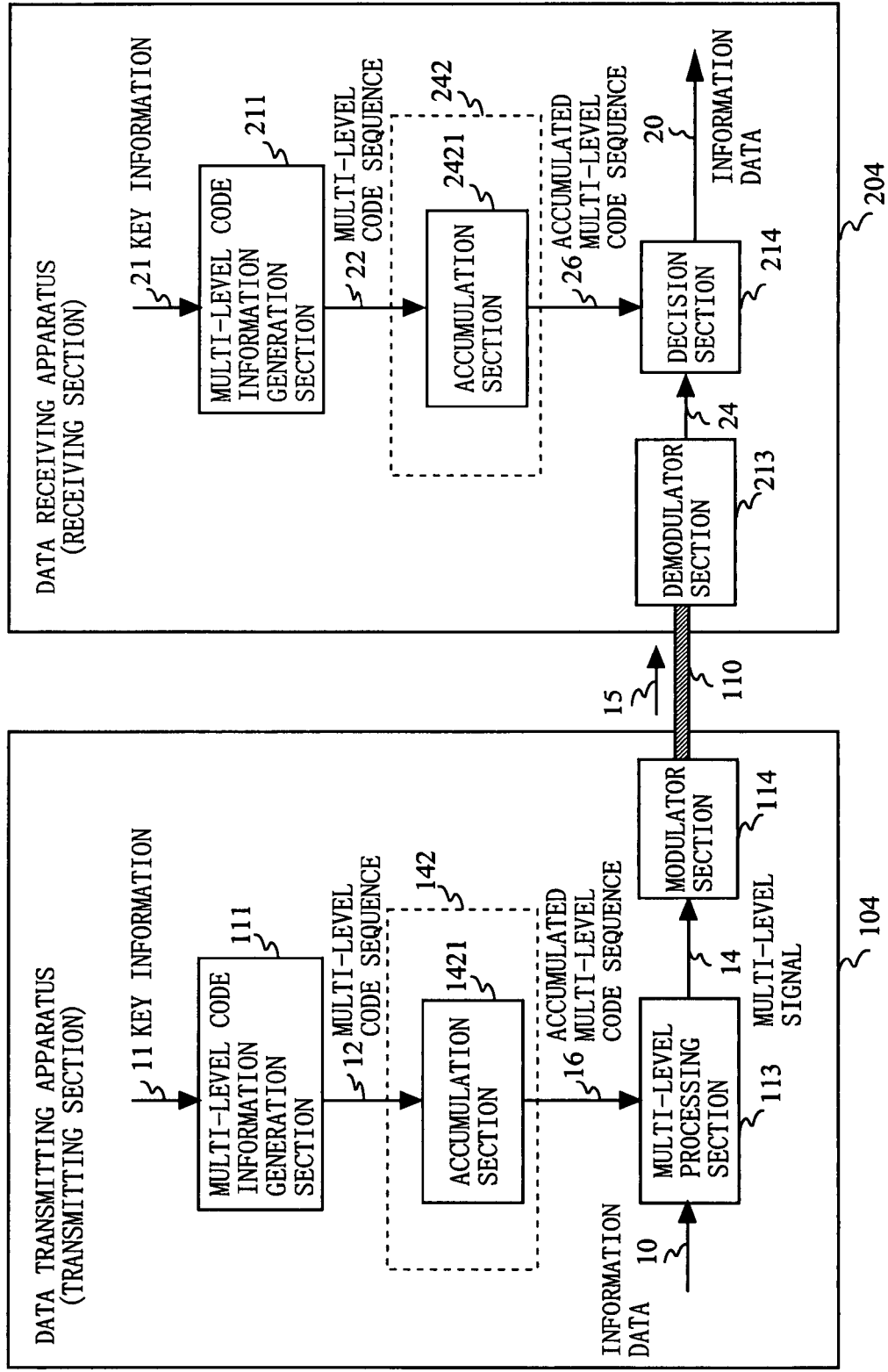
FIG. 10 is a block diagram showing an exemplary configuration of a data communication apparatus 4 according to a fourth embodiment of the present invention.

FIG. 10 is a block diagram showing an exemplary configuration of a data communication apparatus 4 according to a fourth embodiment of the present invention. As shown in FIG. 10, the data communication apparatus 4 has a configuration in which a data transmitting apparatus 104 (hereinafter referred to as a transmitting section 104) and a data receiving apparatus 204 (hereinafter referred to as a receiving section 204) is connected to each other via a transmission line 110. The data communication apparatus 4 is different from the data communication apparatus 3 (see FIG. 7) according to the third embodiment in terms of a configuration of a multi-level code conversion section 142 and a multi-level code conversion section 242. The multi-level code conversion section 142 is constituted of an accumulation section 1421, and the multi-level code conversion section 242 is constituted of an accumulation section 2421. The accumulation section 1421 has the same configuration and performs the same operation as the accumulation section 2421, and thus description of the accumulation section 2421 will be omitted. Hereinafter, component parts which are identical to those of the data communication apparatus 3 according to the third embodiment will be provided common reference characters, respectively, and detailed description thereof will be omitted.

Figure 11:
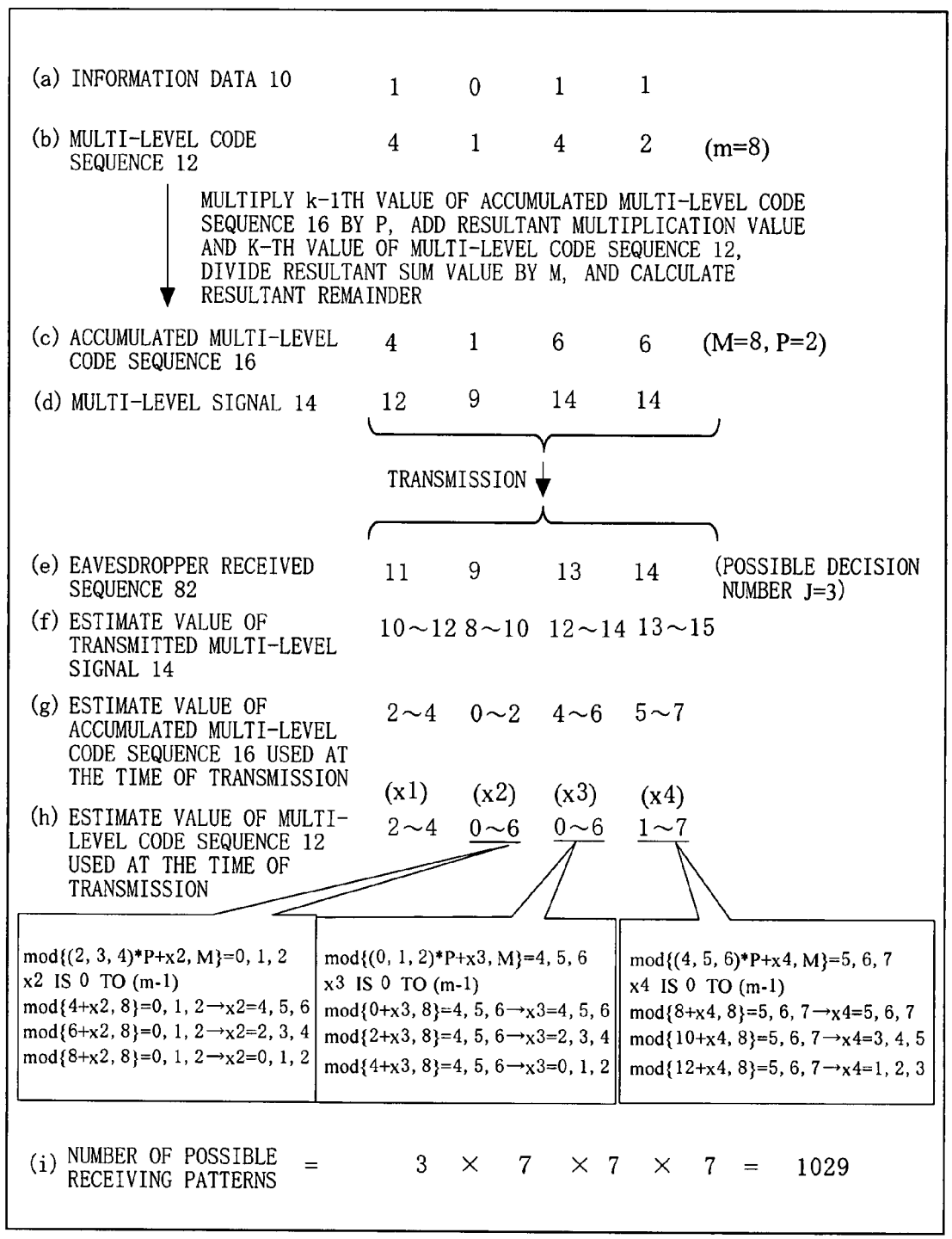
FIG. 11 is a diagram illustrating the number of possible receiving patterns of the data communication apparatus 4 shown in FIG. 10.
Figure 12:
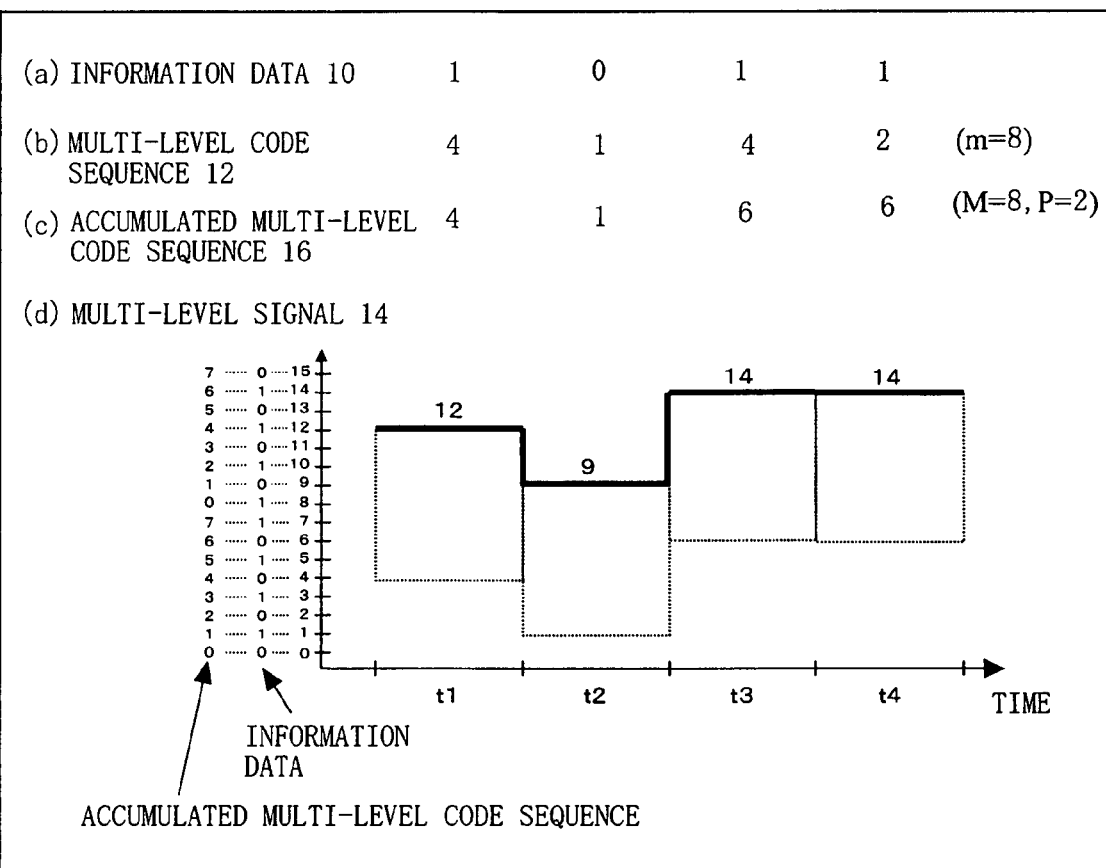
FIG. 12 is a diagram illustrating a multi-level signal 14 shown in FIG. 11(d)

FIG. 11 is a diagram illustrating the number of possible receiving patterns of the data communication apparatus 4 shown in FIG. 10. FIG. 12 is a diagram illustrating the multi-level signal 14 shown in FIG. 11(d). Hereinafter, the details described in the third embodiment will be omitted, and those portions which are different from the third embodiment will be described in detail. As shown in FIG. 11, an exemplary case will be described where the information data 10 {1, 0, 1, 1} and the multi-level code sequence 12 {4, 1, 4, 2} having the multi-level number of m=8 are inputted to the accumulation section 1421 (see (a) and (b) of FIG. 11).

The accumulation section 118 multiplies a (k−1)th value (k is a natural number) of the accumulated multi-level code sequence 16 by P (P is an integer of 2 or more), adds a resultant multiplication value and a kth value of the multi-level code sequence 12, divides a resultant added value by M (M is a natural number), and outputs a resultant remainder as a kth value of the accumulated multi-level code sequence 16. Here, in the case where the (k−1)th value of the accumulated multi-level code sequence 16 is α, the kth value of the multi-level code sequence 12 is β, and the kth value of the accumulated multi-level code sequence 16 is γ, then a relation of γ=mod {αP+β, M} is satisfied. Note that M is the multi-level number of the accumulated multi-level code sequence 16.

In the FIG. 11(c), the accumulated multi-level code sequence 16 in the case of M=8, P=2 is described as a specific example. As shown in FIG. 11, a first value of the accumulated multi-level code sequence 16 is calculated by multiplying a 0th value "0" of the accumulated multi-level code sequence 16 (since the 0th value does not exist, the 0th value is regarded as "0") by 2, adding a resultant multiplication value "0" and a first value "4" of the multi-level code sequence 12, and dividing a resultant added value "4" by 8. Accordingly, the first value of the accumulated multi-level code sequence 16 comes to a resultant remainder value of "4". In a similar manner, a second value of the accumulated multi-level code sequence 16 is calculated by multiplying the first value "4" of the accumulated multi-level code sequence 16 by 2, adding a resultant multiplication value "8" and the second value "1" of the multi-level code sequence 12, and dividing a resultant sum value "9" by 8. Accordingly, the second value of the accumulated multi-level code sequence 16 comes to a resultant remainder value of "1". In a similar manner, the third and the fourth values of the accumulated multi-level code sequence 16 are outputted. That is, {4, 1, 6, 6} is outputted as the accumulated multi-level code sequence 16 (see FIG. 5(C)). Next, to the multi-level processing section 113, the accumulated multi-level code sequence 16 {4, 1, 6, 6} and information data 10 {1, 0, 1, 1} are inputted, and the multi-level processing section 113 generates a multi-level signal 14 {12, 9, 14, 14} in accordance with the signal format shown in FIG. 16 (see FIGS. 11(d) and 12).

Next, eavesdropping by the eavesdropper will be described. In the case of the possible decision number J=3, eavesdropper can receive the modulated signal 15 on the transmission line 110 by using the eavesdropping receiving section 903 (see FIG. 15), and perform multi-level decision so as to obtain, for example, {11, 9, 13, 14} as a received sequence 82 (see FIG. 11(e)). In consideration of the possible decision number J=3, the eavesdropper can estimate that values of the multi-level signal 14, which is a legitimate transmission signal, are within respective ranges of {10 to 12, 8 to 10, 12 to 14, 13 to 15} (see FIG. 11(f)). The eavesdropper can then estimate, by using the signal format shown in FIG. 16, that values of the accumulated multi-level code sequence 16 used by the transmitting section 104 are within respective ranges of {2 to 4, 0 to 2, 4 to 6, 5 to 7} (see FIG. 11(g)).

Next, the eavesdropper needs to perform the inverse operation of the accumulation process, which is performed by the accumulation section 1421 included in the transmitting section 104, so as to derive the multi-level code sequence 12 by using estimate values {2 to 4, 0 to 2, 4 to 6, 5 to 7} of the accumulated multi-level code sequence 16. That is, the eavesdropper needs to calculate β by using the above-described relation of γ=mod {αP+β, M}. Here, estimate values of the multi-level code sequence 12 are represented by {x1, x2, x3, x4}. The multi-level number m of the multi-level code sequence 12 is 8, and thus, x1, x2, x3, and x4 are each any integer from 0 to 7. Accordingly, the first value "2 to 4" of the accumulated multi-level code sequence 16 is calculated by multiplying the 0th value "0" of the accumulated multi-level code sequence 16 by 2 (P=2), adding a resultant multiplication value "0" and "x1", and dividing a resultant sum value "x1" by 8. That is, a resultant remainder corresponds to the first value "2 to 4" of the accumulated multi-level code sequence 16, which is represented by (2,3,4)=mod {0×2+x1, 8}. Therefore, the eavesdropper can estimate that x1 is any one value within the range of "2 to 4". In a similar manner, the second value "0 to 2" of the accumulated multi-level code sequence 16 is calculated by multiplying the first values "2 to 4" of the accumulated multi-level code sequence 16 by 2, adding resultant multiplication values "4, 6, 8" and "x2" respectively, and dividing the resultant sum values "4+x2, 6+x2, 8+x2" by 8. A resultant remainders correspond to the second values "0 to 2" of the accumulated multi-level code sequence 16, which is represented by (0,1,2)=mod {(2,3,4)× 2+x2,8}. Therefore, the eavesdropper can estimate that x2 is any one value within the range of "0 to 6". Hereinafter, in a similar manner, the eavesdropper can estimate that x3 is any one value within the range of "0 to 6", and that x4 is any one value within the range of "1 to 7". In this manner, the eavesdropper can estimate that each of the values of the multi-level code sequence 12 are any value with in each of the ranges of {2 to 4, 0 to 6, 0 to 6, 1 to 7} (see FIG. 11(h)).

Accordingly, the eavesdropper can only narrows possible values, which the multi-level code sequence 12 may take, down to values of "3 patterns×7 patterns×7 patterns×7 patterns=1029 patterns". That is, the number of attempts of the eavesdropper decrypting the multi-level code sequence 12 is a total of 3×7×7×7=1029 patterns (see FIG. 1(i)). That is, the number of the possible receiving patterns of the data communication apparatus 4 according to the fourth embodiment is 1029, which is significantly greater than the number of possible receiving patterns of 375 of the data communication apparatus 3 (see FIG. 8(i)) specifically described in the third embodiment.

As above described, in the data communication apparatus 4 according to the fourth embodiment, the accumulation section 1421, which performs accumulation processing including an integral multiplication of the accumulated multi-level code sequence 18 by 2 or more, is provided, whereby it is possible to further enhance an effect of preventing the cipher decryption, the effect being caused by the erroneous multi-level decision which occurs when the eavesdropper receives (intercepts) the modulated signal, compared to the effect of preventing the cipher decryption specifically described in the third embodiment. As a result, the data communication apparatus 4 according to the fourth embodiment further increases the number of the possible receiving patterns, and is capable of ensuring higher security in cipher communication. Further, the data communication apparatus 4 according to the fourth embodiment generates the accumulated multi-level code sequence 16 by using the above-described remainder value during the above-described accumulation processing performed by the accumulation section 1421. Accordingly, it is possible to prevent divergence of the accumulated multi-level code sequence 16. Further, the receiving section 104 includes the accumulation section 2421 which has the same configuration as the accumulation section 1421, and thus it is possible to decode the information data 20 which is equal to the information data 10.

Figure 13:
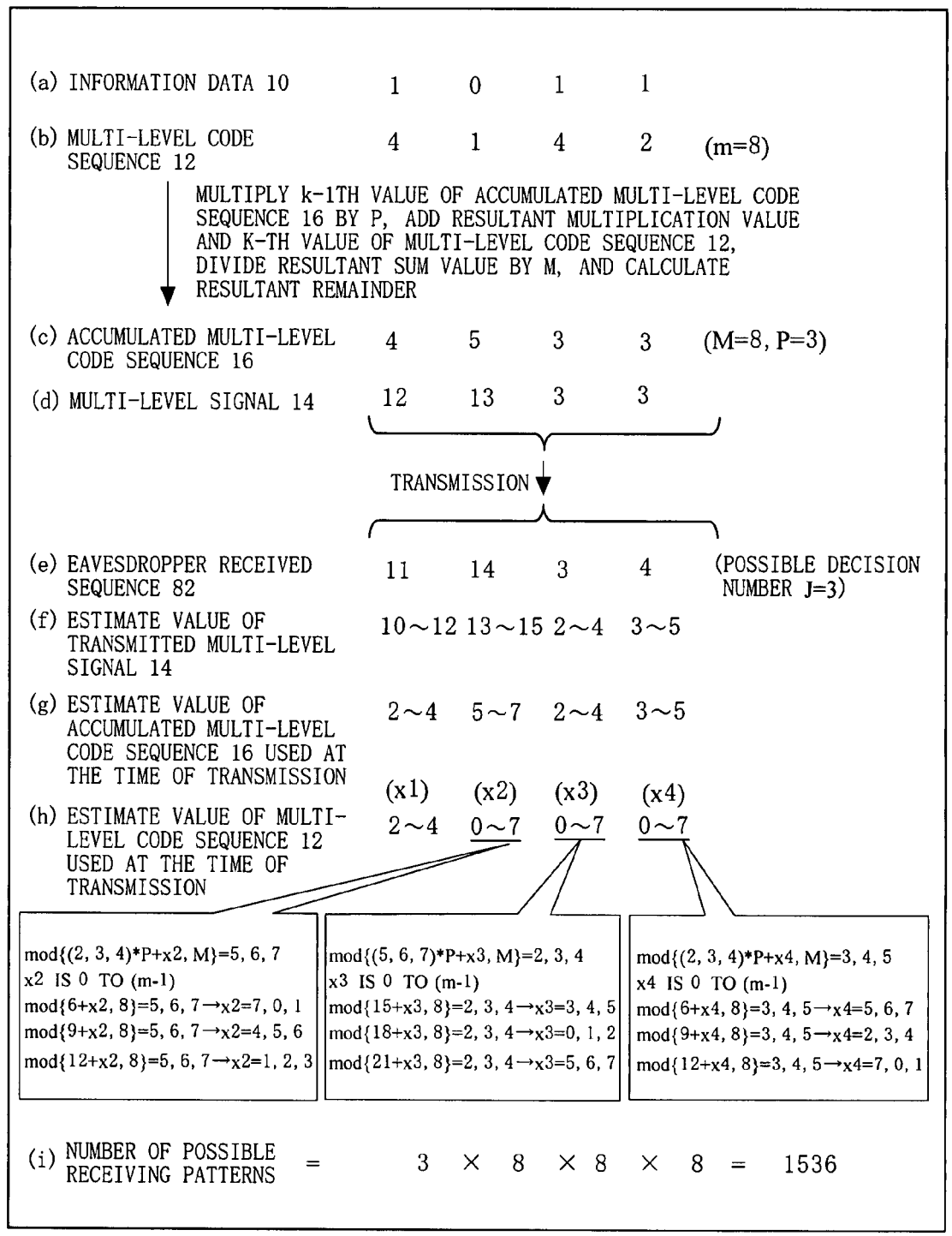
FIG. 13 is a diagram illustrating the number of possible receiving patterns in the case of a possible decision number J=P=3.

The integer P equal to 2 or more, which is used by the accumulation section 1421 during the above-described accumulation processing, is set equal to or more than the possible decision number J. Accordingly, the number of the possible receiving patterns can be maximized. FIG. 13 is a diagram illustrating the number of the possible receiving patterns in the case of the possible decision number J=P=3. Under the condition of J=P=3, when the eavesdropper estimates the multi-level code sequence 12 in accordance with the method having been described with reference to FIG. 11, the estimate values of the multi-level code sequence 12 come to {2 to 4, 0 to 7, 0 to 7, 0 to 7} (see FIG. 13(h)). Therefore, P is set equal to or more than the possible decision number J, whereby it is possible to increase the number of the possible receiving patterns to 3×8×8×8=1536 (see FIG. 13(i)).

Note that a first estimate value of the multi-level code sequence 12 is {2 to 4}, and thus the number of the possible receiving patterns of the first value of the multi-level code sequence 12 is 3, which is not increased to be greater than the possible decision number J=3. This is because the 0th value of the accumulated multi-level code sequence 16 is always "0", and the first value of the multi-level code sequence 12 is always equal to the first value of the accumulated multi-level code sequence 16. Accordingly, the accumulation section 1421 generates the multi-level signal 14 using the second value or thereafter of the accumulated multi-level code sequence 16 without using the first value of the accumulated multi-level code sequence 16. That is, a (k+1)th value (k is a natural number) of the accumulated multi-level code sequence 16 is used as a kth value of the accumulated multi-level code sequence 16. Accordingly, the number of possible receiving patterns of the first value of the multi-level code sequence 12 can be made equal to 8, which is the number of the possible receiving patterns of the second value or thereafter of the multi-level code sequence 12. As a result, the number of the possible receiving patterns increases to 8×8×8×8=4096. Further, since the multi-level number m of the multi-level code sequence 12 is 8, the eavesdropper cannot narrow down the values of the multi-level code sequence 12.

In this manner, P is set equal to or more than the possible decision number J, and the multi-level signal 14 is generated by using the second value or thereafter of the accumulated multi-level code sequence 16, whereby the number of the possible receiving patterns of each of the values of the multi-level code sequence 12, which the eavesdropper needs to consider at the time of decryption, is increased up to a maximum of the square of the possible decision number J. Therefore, the multi-level number M of the accumulated multi-level code sequence 16 is set equal to or less than the square of the possible decision number j, whereby the number of the possible receiving patterns of each of the values of the multi-level code sequence 12 may be increased to the multi-level number M, and computational complexity required for the cipher decryption may be maximized.

Fifth Embodiment

Figure 14:
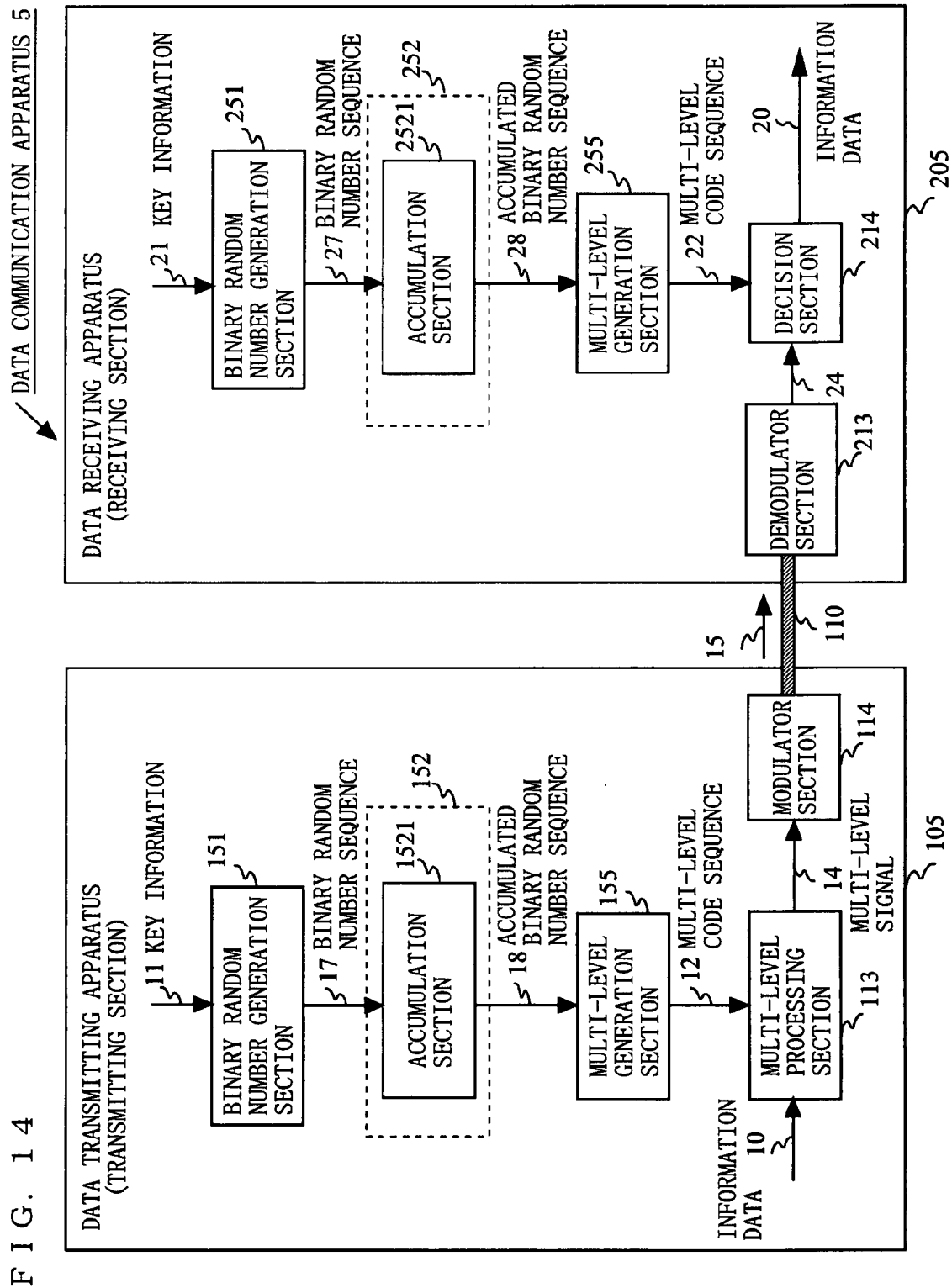
FIG. 14 is a block diagram showing an exemplary configuration of a data transmitting apparatus 5 according to a fifth embodiment of the present invention.

FIG. 14 is a block diagram showing an exemplary configuration of the data transmitting apparatus 5 according to a fifth embodiment of the present invention. As shown in FIG. 14, the data communication apparatus 5 has a configuration in which a data transmitting apparatus 105 (hereinafter referred to as a transmitting section 105), and a data receiving apparatus 205 (hereinafter referred to as a receiving section 205) is connected to each other via a transmission line 110. The transmitting section 105 includes a binary random number generation section 151, a multi-level code conversion section 152, a multi-level generation section 155, a multi-level processing section 113, and a modulator section 114. The receiving section 205 includes a demodulator section 213, a decision section 214, a binary random number generation section 251, a multi-level encoding section 252, and a multi-level generation section 255. The multi-level code conversion section 152 is constituted of an accumulation section 1521, and the multi-level code conversion section 252 is constituted of an accumulation section 2521. Hereinafter, component parts, which are the same as those included in the data communication apparatus 3 according to the third embodiment, will be provided common reference characters, and detail description thereof will be omitted.

In the transmitting section 105, the binary random number generation section 151 generates, based on key information 11, a binary random number sequence 17 whose values change in binary so as to be approximately random numbers. The binary random number sequence 17 is inputted to the multi-level conversion section 152. In the multi-level conversion section 152, the accumulation section 1521 divides the binary random number sequence 17 into blocks each having r bits (r is a natural number), accumulates two or more blocks of the divided blocks, and generates an accumulated binary random number sequence 18. The multi-level generation section 155 converts the accumulated binary random number sequence 18 into a multi-level code sequence 12 whose values change so as to be an approximately random numbers in accordance with a predetermined multi-level encoding rule (for example, a signal format shown in FIG. 16). Since an operation thereafter is the same as the operations described in the third and fourth embodiments, description thereof will be omitted. In the receiving section 205, the binary random number generation section 251 performs the same operation as the binary random number generation section 151 at the transmitting end, the accumulation section 2521 performs the same operation as the accumulation section 1521 at the transmitting end, and the multi-level generation section 255 performs the same operation as the multi-level generation section 155 at the transmitting end. Accordingly, the receiving section 205 can decode information data 20 which is equal to the information data 10.

As above described, By using the data communication apparatus 5 according to the fifth embodiment, the binary random number sequence is accumulated, whereby it is possible to generate, through multi-level processing, the multi-level code sequence from the accumulated binary random number sequence. Accordingly, it is possible to increase the number of the possible receiving patterns in the same manner as the data communication apparatus 3 according to the third embodiment, and also possible to ensure high security in cipher communication.

In the data communication apparatus 5 according to the fifth embodiment, it is also possible to prevent divergence of the accumulated binary random number sequence in the same manner as the data communication apparatus 3 according to the third embodiment and the data communication apparatus 4 according to the fourth embodiment. Specifically, in the case where a length of an inputted binary code sequence 17 reaches to a predetermined length (a predetermined number of codes), the accumulation section 1521 resets respective values of an accumulated 2 binary code sequence 18, which is accumulated values of a binary code sequence 17, each to a predetermined value. The accumulation section 2521 performs a similar operation. Accordingly, it is possible to prevent respective values of the accumulated binary code sequences 18 and 28 from diverging from each other. Other methods for preventing the divergence, which are described in the third embodiment and the fourth embodiment, may be also applied to the data communication apparatus 5.

Further, in the above description in the first to fifth embodiments, a case has been described where a signal format shown in FIG. 16 is used. However, the signal format to be used is not limited thereto. For example, a signal format, in which the information data "1" is consistently allocated to a higher level and the information data "0" is consistently allocated to a lower level of the modulation pair, may be used.

The data communication apparatus according to the present invention is useful for a secret communication apparatus which is safe and insusceptible to the eavesdropping, the interception and the like.

While the invention has been described in detail, the foregoing description is in all aspects illustrative and not restrictive. It is understood that numerous other modifications and variations can be devised without departing from the scope of the invention.

What is claimed is:

1. A data transmitting apparatus for encrypting information data by using predetermined key information and performing secret communication with a receiving apparatus, the data transmitting apparatus comprising:
   a multi-level code generation section for generating, based on the predetermined key information, a multi-level code sequence in which a signal level changes so as to be approximately random numbers;
   a multi-level code conversion section for converting the multi-level code sequence into a converted multi-level code sequence;
   a multi-level processing section for combining the information data and the converted multi-level code sequence and generating a multi-level signal having a plurality of levels each corresponding to a combination of the information data and the converted multi-level code sequence; and
   a modulator section for modulating the multi-level signal in a predetermined modulation method, and outputting a modulated signal, wherein
   the multi-level code conversion section irreversibly converts the multi-level code sequence such that the converted multi-level code sequence does not become a mapping of the multi-level code sequence.

2. The data transmitting apparatus according to claim 1, wherein
   the predetermined key information includes a plurality of pieces of key information,
   the multi-level code generation section generates, based on the plurality of pieces of the key information, a plurality of the multi-level code sequences each in which the signal level changes so as to be approximately random numbers, and
   the multi-level code conversion section converts the plurality of the multi-level code sequences into the converted multi-level code sequence.

3. The data transmitting apparatus according to claim 1, wherein
   the multi-level code conversion section is constituted of an accumulation section which generates, as the converted multi-level code sequence, an accumulated multi-level code sequence which is obtained by accumulating values included in the multi-level code sequence, and
   the accumulation section adds a value obtained by multiplying a (k−1)th value of the accumulated multi-level code sequence by a predetermined number and a kth value of the multi-level code sequence, and sets a resultant added value as a kth value of the accumulated multi-level code sequence.

4. The data transmitting apparatus according to claim 1, wherein
the multi-level code conversion section is constituted of an accumulation section which generates, as the converted multi-level code sequence, an accumulated multi-level code sequence which is obtained by accumulating values included in the multi-level code sequence, and
the accumulation section adds a value obtained by multiplying a (k−1)th value of the accumulated multi-level code sequence by a predetermined number and a kth value of the multi-level code sequence, divides a resultant added value by a predetermined value, and sets a resultant remainder as a kth value of the accumulated multi-level code sequence.

5. The data transmitting apparatus according to claim 1, wherein
the multi-level code conversion section is constituted of an accumulation section which generates, as the converted multi-level code sequence, an accumulated multi-level code sequence which is obtained by accumulating values included in the multi-level code sequence, and
the accumulation section outputs a (k+1)th value of the accumulated multi-level code sequence as a kth value of the accumulated multi-level code sequence.

6. The data transmitting apparatus according to claim 1, wherein a multi-level number of the multi-level code sequence is equal to or less than a square of a number of multi levels which appear within a distribution width of a disturbing element which is overlapped on the modulated signal upon reception of the modulated signal.

7. A data receiving apparatus for receiving information data which is encrypted by using predetermined key information, and performing secret communication with a data transmitting apparatus, the data receiving apparatus comprising:
a multi-level code generation section for generating, based on the predetermined key information, a multi-level code sequence in which a signal level changes so as to be approximately random numbers;
a multi-level code conversion section for converting the multi-level code sequence into a converted multi-level code sequence;
a demodulator section for demodulating, in a predetermined demodulation method, a modulated signal received from the data transmitting apparatus, and outputting a multi-level signal having a plurality of levels each corresponding to a combination of the information data and the converted multi-level code sequence; and
a decision section for deciding which is the information data from the multi-level signal in accordance with the converted multi-level code sequence, wherein
the multi-level code conversion section irreversibly converts the multi-level code sequence such that the converted multi-level code sequence does not become a mapping of the multi-level code sequence.

8. The data receiving apparatus according to claim 7, wherein
the predetermined key information includes a plurality of pieces of key information,
the multi-level code generation section generates, based on the plurality of pieces of key information, a plurality of the multi-level code sequences each in which a signal level changes so as to be approximately random numbers, and
the multi-level code conversion section converts the plurality of the multi-level code sequences into the converted multi-level code sequence.

9. The data receiving apparatus according to claim 7, wherein
the multi-level code conversion section is constituted of an accumulation section which generates, as the converted multi-level code sequence, an accumulated multi-level code sequence which is obtained by accumulating values included in the multi-level code sequence, and
the accumulation section adds a value obtained by multiplying a (k−1)th value of the accumulated multi-level code sequence by a predetermined number and a kth value of the multi-level code sequence, and sets a resultant added value as a kth value of the accumulated multi-level code sequence.

10. A data transmitting method, using a data transmitting apparatus, for encrypting information data by using predetermined key information, and performing secret communication with a receiving apparatus,
wherein the data transmitting apparatus includes:
a multi-level code generation section;
a multi-level code conversion section;
a multi-level processing section; and
a modulator section,
the data transmitting method comprising:
a multi-level code generation step of generating, by the multi-level code generation section, based on the predetermined key information, a multi-level code sequence in which a signal level changes so as to be approximately random numbers;
a multi-level code conversion step of converting, by the multi-level code conversion section, the multi-level code sequence into a converted multi-level code sequence;
a multi-level processing step of combining, by the multi-level processing section, the information data and the converted multi-level code sequence, and generating a multi-level signal having a plurality of levels each corresponding to a combination of the information data and the converted multi-level code sequence; and
a modulation step of modulating, by the modulator section, the multi-level signal in a predetermined modulation method, and outputting a modulated signal, wherein
the multi-level conversion step irreversibly converts the multi-level code sequence such that the converted multi-level code sequence does not become a mapping of the multi-level code sequence.

11. A data receiving method, using a data receiving apparatus, for receiving information data which is encrypted by using predetermined key information, and performing secret communication with a data transmitting apparatus,
wherein the data receiving apparatus includes:
a multi-level code generation section;
a multi-level code conversion section;
a demodulator section; and
a decision section,
the data receiving method comprising:
a multi-level code generation step of generating, by the multi-level code generation section, based on the predetermined key information, a multi-level code sequence in which a signal level changes so as to be approximately random numbers;
a multi-level code conversion step of converting, by the multi-level code conversion section, the multi-level code sequence into a converted multi-level code sequence;
a demodulation step of demodulating, by the demodulator section, in a predetermined demodulation method, a modulated signal received from the data transmitting apparatus, and outputting a multi-level signal having a plurality of levels each corresponding to a combination of the information data and the converted multi-level code sequence; and a decision step of deciding, by the decision section, which is the information data from the multi-level signal in accordance with the converted multi-level code sequence, wherein the multi-level code conversion step irreversibly converts the multi-level code sequence such that the converted multi-level code sequence does not become a mapping of the multi-level code sequence.

* * * * *